United States Patent
Pierson et al.

[15] 3,648,618
[45] Mar. 14, 1972

[54] SUBFLOOR CONVEYOR SYSTEM AND DOLLY THEREFOR

[72] Inventors: Edward D. Pierson, Denver; James C. Wright, Golden; Carl C. De Rozario; Peter Nemeth, both of Denver, all of Colo.

[73] Assignee: Cutler-Hammer, Inc., Milwaukee, Wis.

[22] Filed: Mar. 9, 1970

[21] Appl. No.: 17,583

[52] U.S. Cl. ........................104/170, 104/172 BT, 104/178
[51] Int. Cl. ........................................................B65g 17/42
[58] Field of Search ................104/172 BT, 172 C, 178, 170; 280/47, 29

[56] References Cited

UNITED STATES PATENTS

| 3,438,338 | 4/1969 | Bildsoe et al. | 104/172 C |
| 3,467,025 | 9/1969 | Bradt | 104/172 C |
| 3,425,361 | 2/1969 | Bishop | 104/172 BT |
| 3,521,568 | 7/1970 | Kato et al. | 104/172 BT |
| 2,660,127 | 11/1953 | Boyko et al. | 104/172 BT |
| 1,035,352 | 8/1912 | Johnson | 280/47.29 |
| 2,965,043 | 12/1960 | Klamp et al. | 104/172 BT |
| 3,045,610 | 7/1962 | Klamp | 104/88 |

FOREIGN PATENTS OR APPLICATIONS

| 727,279 | 3/1955 | Great Britain | 104/172 BT |

*Primary Examiner*—Arthur L. La Point
*Assistant Examiner*—Robert Saifer
*Attorney*—Anderson, Spangler & Wymore

[57] ABSTRACT

This invention relates to a subfloor sprocket-driven chain conveyor wherein foreshortened links provide gaps adapted to receive a pin projecting therein from the underside of the dolly through a guide slot or track. A slack takeup mechanism is provided for the main chain whereby it is diverted from underneath the slot around a system of idler chains while a secondary chain conveyor picks up the dolly and transports it across the space where the main chain has been diverted to a position where it is again picked up by the latter. A diverter switch can be activated to engage the dolly pin and more the dolly off into an intersecting spur line employing a secondary sprocket-driven chain that carries a switch-actuating pawl followed by a dolly pin pickup dog adapted to pull the dolly off onto the spur. A return switch mechanism actuated by the dolly pin being pushed thereagainst by the pickup dog will transfer the dolly back to the main chain conveyor from a secondary intersecting conveyor when the latter is actuated in response to a sensor that locates a gap in the main chain and synchronizes the movement of the pin to coincide therewith. Another type of return switch mechanism shunts the dolly pin from one conveyor off onto a siding where it is picked up by a second nonintersecting conveyor paralleling the first as soon as a gap appears. A holding mechanism includes a first switch member operative upon actuation to engage the dolly pin and move the dolly off onto a siding against the force exerted thereon by a second spring-biased switch member that actuates automatically to return the dolly to the system upon deactuation of the first switch means. The dolly itself has a turntable-type top and a retractable pickup pin having three positions, a retracted position where it is disengaged from both the conveyor system and the slotted track, an intermediate position engaged within the slotted track but disengaged from the conveyor system, and an extended position engaged by the conveyor together with all of the aforementioned appurtenances associated therewith.

15 Claims, 29 Drawing Figures

Patented March 14, 1972

INVENTORS
EDWARD D. PIERSON
JAMES C. WRIGHT
CARL C. DE ROZARIO
PETER NEMETH
BY
ATTORNEYS

Patented March 14, 1972

INVENTORS
EDWARD D. PIERSON
JAMES C. WRIGHT
CARL C. DE ROZARIO
PETER NEMETH
BY
ATTORNEYS

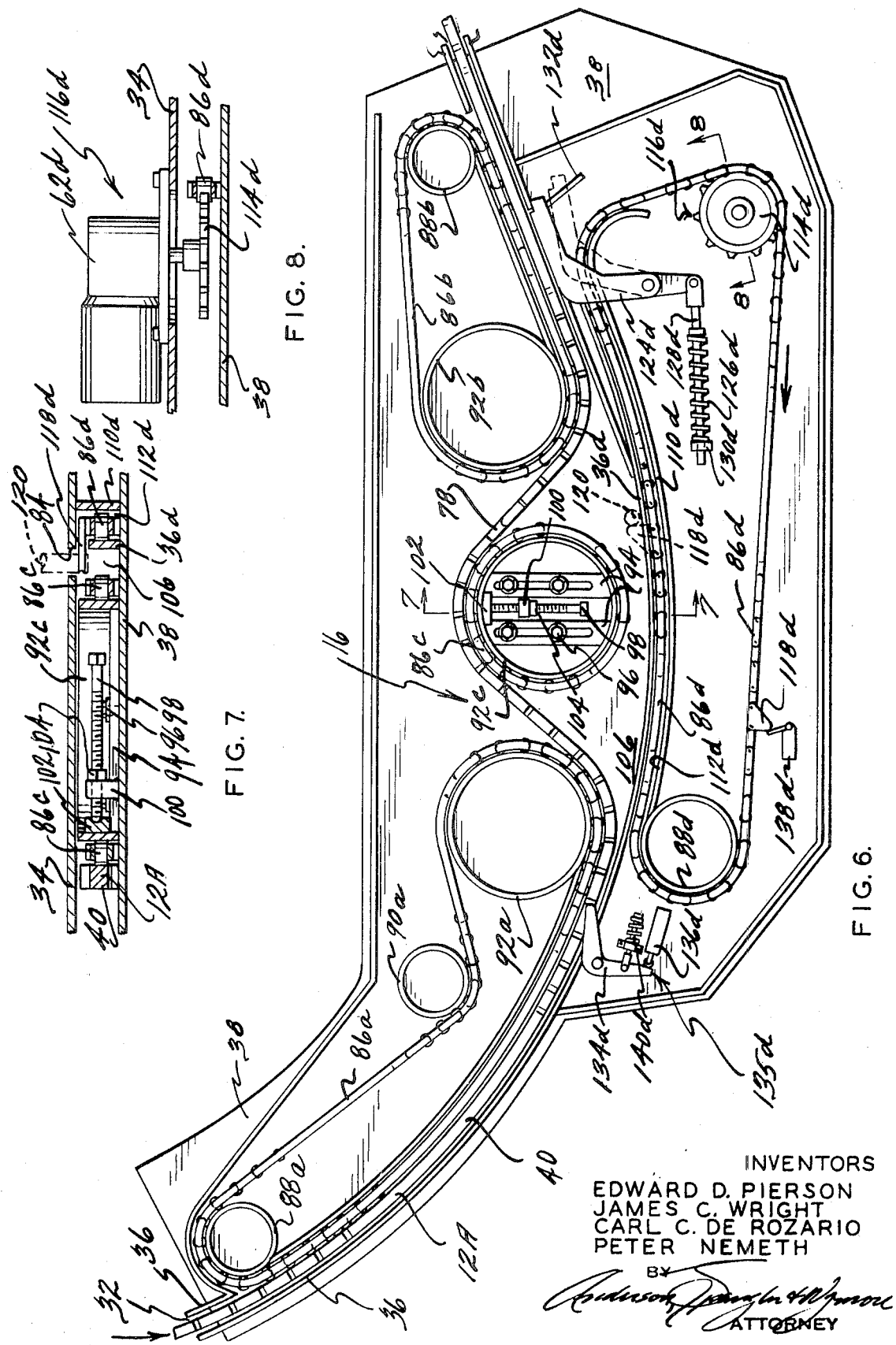

Patented March 14, 1972
3,648,618
10 Sheets-Sheet 4
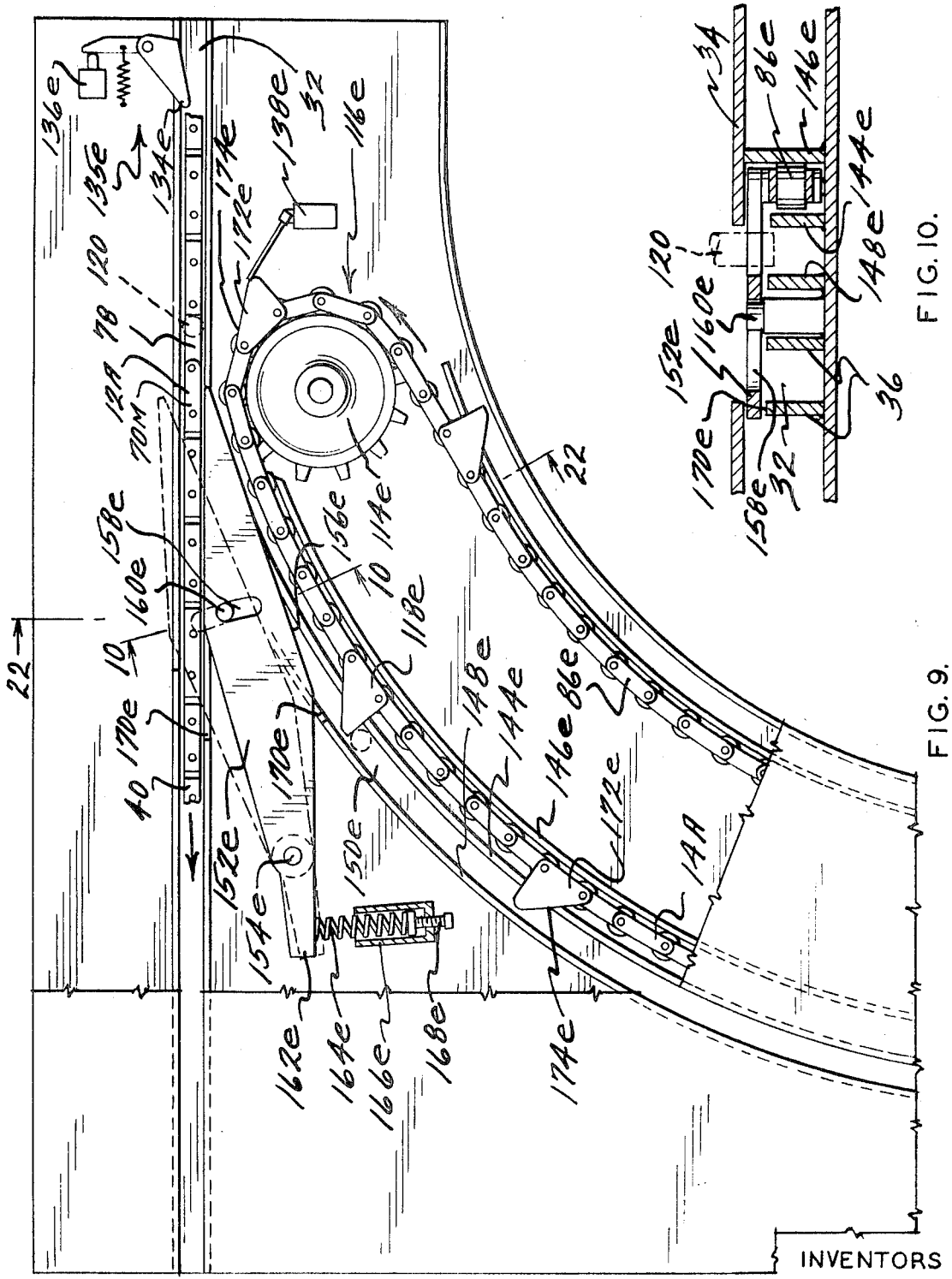
FIG. 9.     FIG. 10.
INVENTORS
EDWARD D. PIERSON
JAMES C. WRIGHT
CARL C. DE ROZARIO
PETER NEMETH
BY
ATTORNEYS Patented March 14, 1972

INVENTORS
EDWARD D. PIERSON
JAMES C. WRIGHT
CARL C. DE ROZARIO
PETER NEMETH

BY
ATTORNEYS

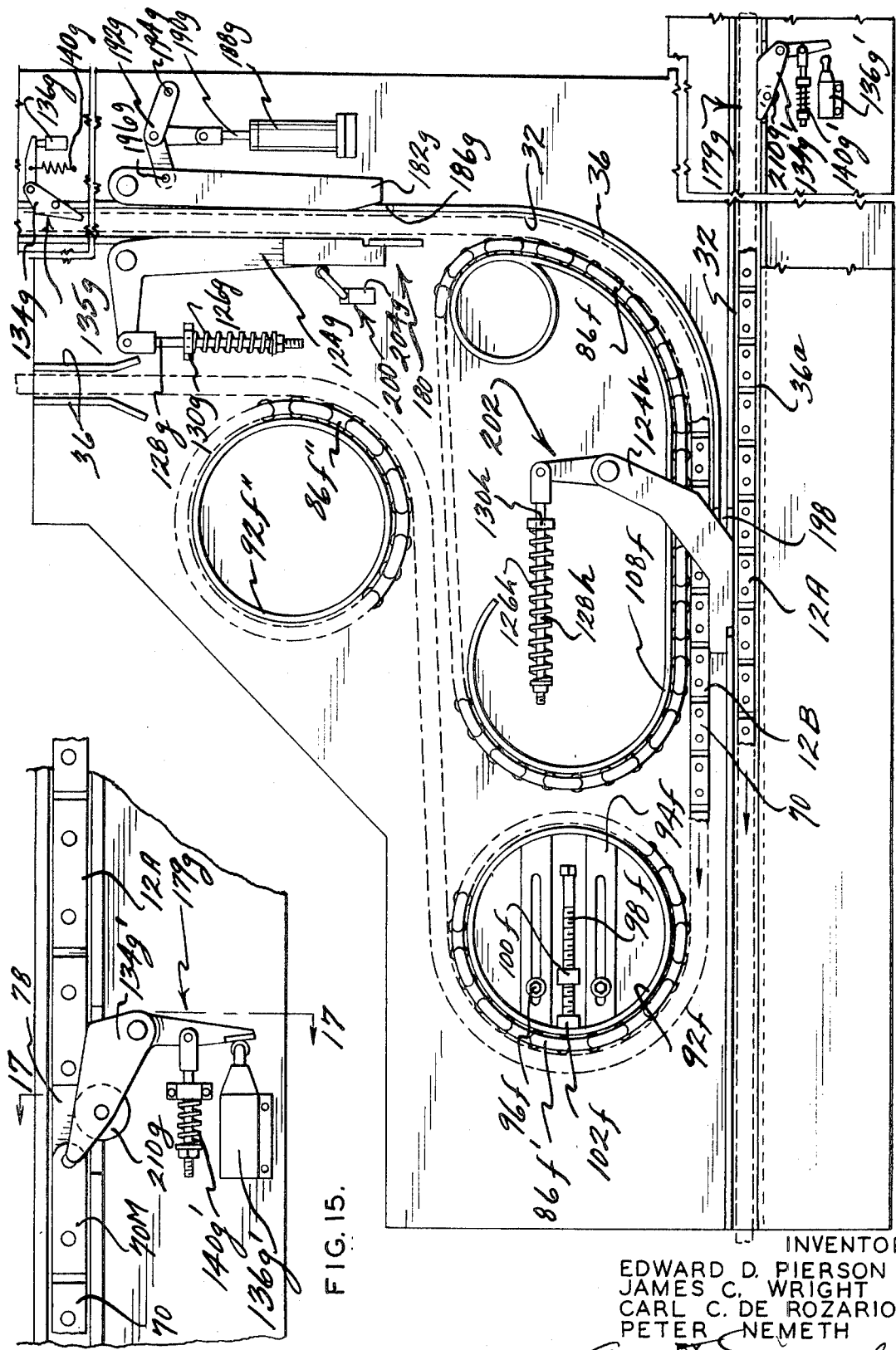

INVENTORS
EDWARD D. PIERSON
JAMES C. WRIGHT
CARL C. DE ROZARIO
PETER NEMETH

BY
ATTORNEYS

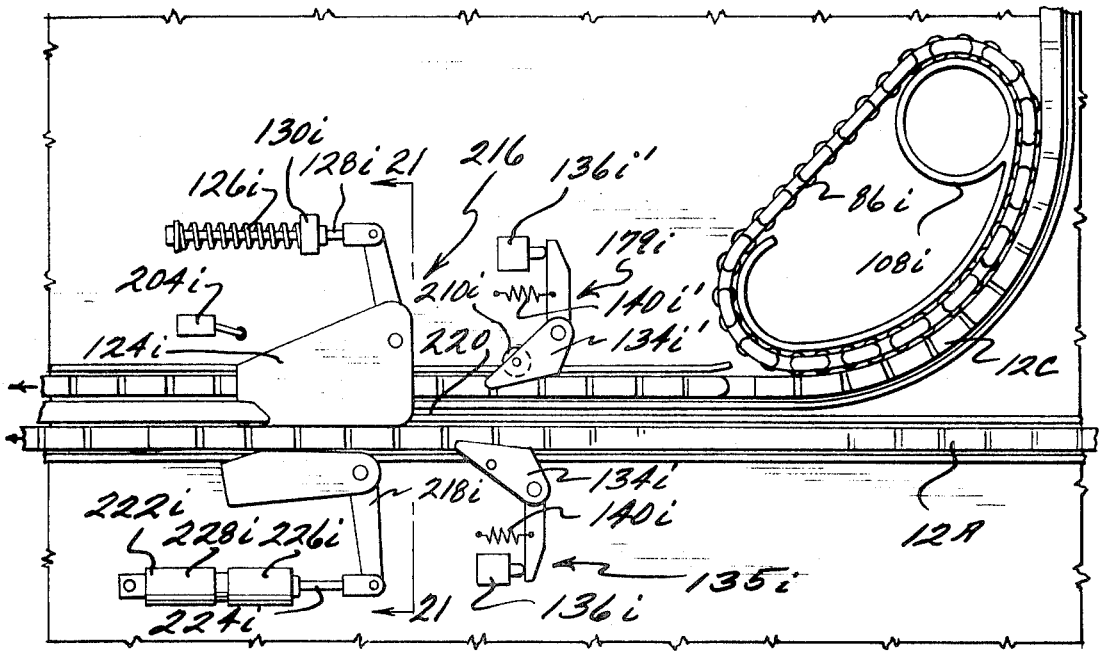
FIG. 18.
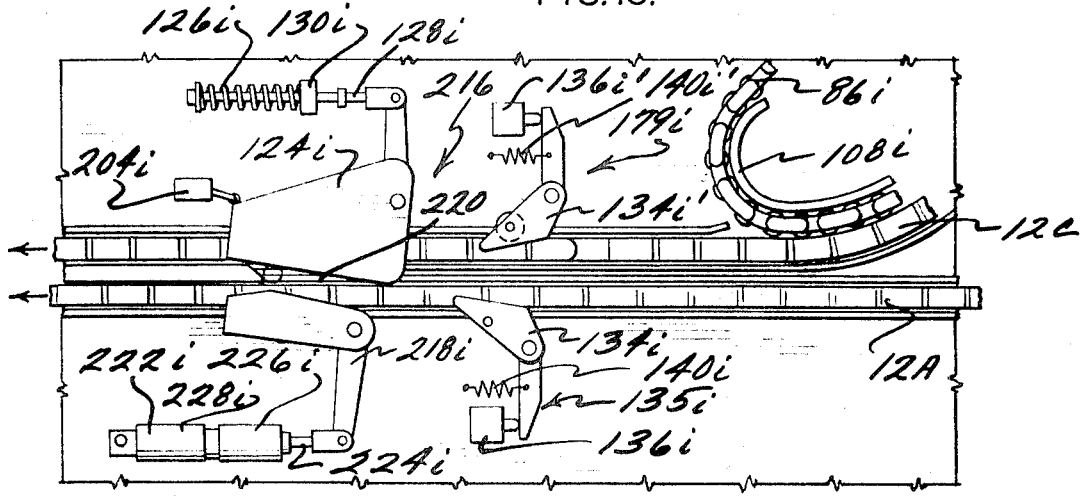
FIG. 19.
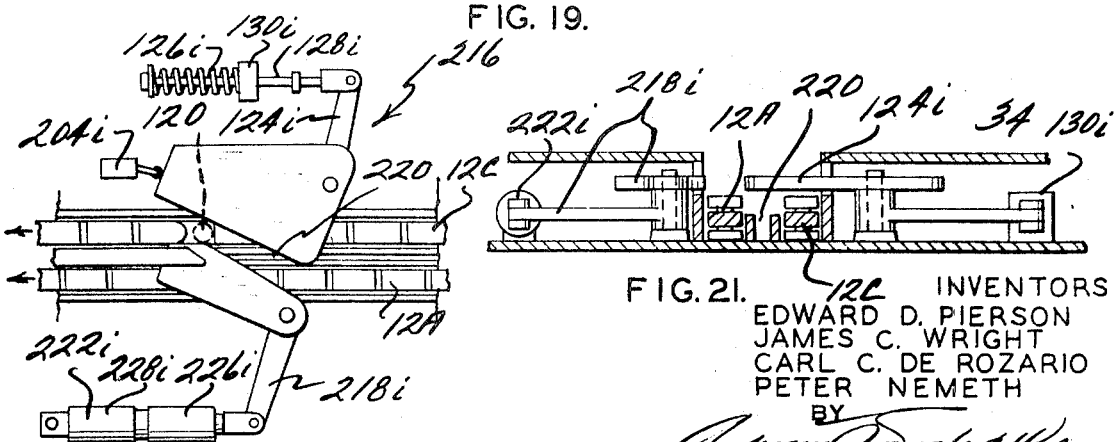
FIG. 20.
FIG. 21.
INVENTORS
EDWARD D. PIERSON
JAMES C. WRIGHT
CARL C. DE ROZARIO
PETER NEMETH
BY
ATTORNEY

INVENTORS
EDWARD D. PIERSON
JAMES C. WRIGHT
CARL C. DE ROZARIO
PETER NEMETH

ATTORNEYS

INVENTORS
EDWARD D. PIERSON
JAMES C. WRIGHT
CARL C. DE ROZARIO
PETER NEMETH

ATTORNEYS

SUBFLOOR CONVEYOR SYSTEM AND DOLLY THEREFOR

The conveyor system of the present invention was designed primarily to move full rolls of newsprint from the loading dock to the press room and partial rolls back and forth between the press room and a holding or storage station although, obviously, the system could easily be adapted for use in conveying many other types of goods from place to place.

One of the main features of the system is that both the primary and secondary chains move within a subfloor track or chain run on their sides so that the axes of the pivot pins between the links are vertical rather than horizontal. By so doing, a series of longitudinally spaced gaps can be provided in the top of the chain by foreshortening certain links and these gaps can, in turn, receive a pin projecting from through a guide slot in the floor from the underside of a dolly thus enabling the chain to pull the latter when driven by a sprocket drive. Also, dogs and pawls projecting horizontally from secondary chains moving alongside the slot can be used to engage the pickup pin and switch the dolly both onto and off of the primary chain. These secondary chain loops are independently driven and synchronized with the movement of the primary chain by sensors which locate a vacant gap in the latter and start the secondary sprocket drive so as to deliver the dolly to the primary chain just in time for the pickup pin to enter said gap. These secondary chain loops are provided at slack takeup stations for the main chain and at each intersecting spur. The crossover switch mechanism is used to shift the dolly form one primary chain to another nonintersecting parallel run of primary chain.

For most purposes, the primary chain loops are designed to run continuously, whereas, the secondary loops are designed for intermittent operation. Two different types of holding stations must, therefore, be provided, one ahead of a crossover switch between parallel runs of primary chain and a second on a secondary chain spur. In the first, an accumulation switch has been provided to move the dolly off onto a siding while the first primary chain continues to run and the sensor is locating a vacant gap in the other primary chain so it can actuate the switch to return the held dolly back into the system in time to enter said gap. The second holding station comprises a movable section of track alongside a secondary chain that can be shifted with a dolly located thereon into alignment with slotted floor plates of a dolly storage area. A dolly carrying a roll of the desired length can thus be selected from among several in the storage area, placed up on the movable track section and fed back into the primary chain system by energizing the secondary chain loop through a return switch. In the same way, a partially used roll can be stored in the holding or storage area until needed by shunting same off onto the secondary chain loop through a switch in the primary chain loop.

The mechanism for taking up slack in the primary chain loop is also unique. The primary chain leaves the main track and is reaved between a pair of stationary idler chain loops and over an adjustable idler chain loop located therebetween, the latter chain providing the means for taking up slack. An intermittently driven secondary chain loop picks up the dolly as it leaves the primary chain and pulls it across the takeup gap until the primary chain once again takes over. These two chains are synchronized so that the dolly returns to the same position in the primary chain that it left at the entrance to the takeup section.

The retractable pin on the underside of the dolly enables it to be released completely from both the track and conveyor, guided by the track while remaining disconnected from the conveyor, and engaged by the conveyor and track. A foot pedal actuator on the side of the dolly connects to the pin and is used to retract same. A turntable atop the dolly enables the roll of newsprint to be turned to any desired position.

It is, therefore, the principal object of the present invention to provide an improved subfloor chain conveyor system for hauling dollies and the like around a plant.

A second objective of the invention herein disclosed and claimed is to provide a continuously driven primary chain operatively associated with one or more secondary chain loops that cooperate with said primary chain to transfer the dollies on and off the latter in synchronous relationship.

Another object is to provide a pair of primary chain loops having sections paralleling one another and switch subassembly associated with one of said chains operative to transfer a dolly to the other upon sensing a dolly receiving gap in the latter.

Still another objective of the invention forming the subject matter hereof is the provision of intermittently driven secondary chain loops containing both bypass and return switches that can be used to shunt the dollies off onto a spur line and back again.

An additional object is the provision of movable track sections in a spur line that cooperate with the retractable pin on the underside of the dollies to enable the latter to be disconnected from the secondary chain and moved to stationary track sections in a dolly storage area.

Further objects of the invention are to provide a subfloor chain conveyor system that employs a novel slack takeup mechanism, one-way over driving clutches in the main drive mechanisms to keep the primary chain moving even when one drive mechanism has become inoperative, and a system of the type aforementioned that is relatively simple, rugged, efficient, easy to service, versatile, and even inexpensive when compared with other subfloor chain conveyor systems of comparable complexity.

Other objects will be in part apparent and in part pointed out specifically hereinafter in connection with the description of the drawings that follows, and in which:

FIG. 6 is a fragmentary top plan view with the floorplates removed showing the primary chain slack takeup subassembly;

FIG. 7 is a fragmentary section taken along line 7—7 of FIG. 6;

FIG. 8 is a fragmentary section taken along line 8—8 of FIG. 6;

FIG. 9 is a fragmentary top plan view with the floor plates removed showing bypass switch subassembly that employs a secondary intermittently driven chain loop to take the dollies from the primary chain off onto a spur;

FIG. 10 is a fragmentary section taken along line 10—10 of FIG. 9;

FIG. 14 is a fragmentary top plan view with the floor plates removed showing an accumulator switch subassembly for transferring a dolly from one primary chain loop to another parallel primary chain loop;

FIG. 15 is an enlarged fragmentary detail of the gap-sensing switch of FIG. 14 showing the latter in actuated position;

FIG. 18 is a fragmentary top plan view showing a switch subassembly for switching a dolly off of one primary chain onto another running parallel thereto in spaced relation;

FIG. 19 is a fragmentary top plan view of the switch subassembly of FIG. 18 except that the switch elements are in their partially extended positions operative to shunt the dolly pin off into a neutral area between the chains;

FIG. 20 is a fragmentary top plan view of the switch subassembly of FIGS. 18 and 19 except that the spring-actuated switch arm is shown in fully retracted position while the servomotor actuated one is shown in fully extended position;

FIG. 21 is a fragmentary section taken along line 21—21 of FIG. 18;

Figure 1:
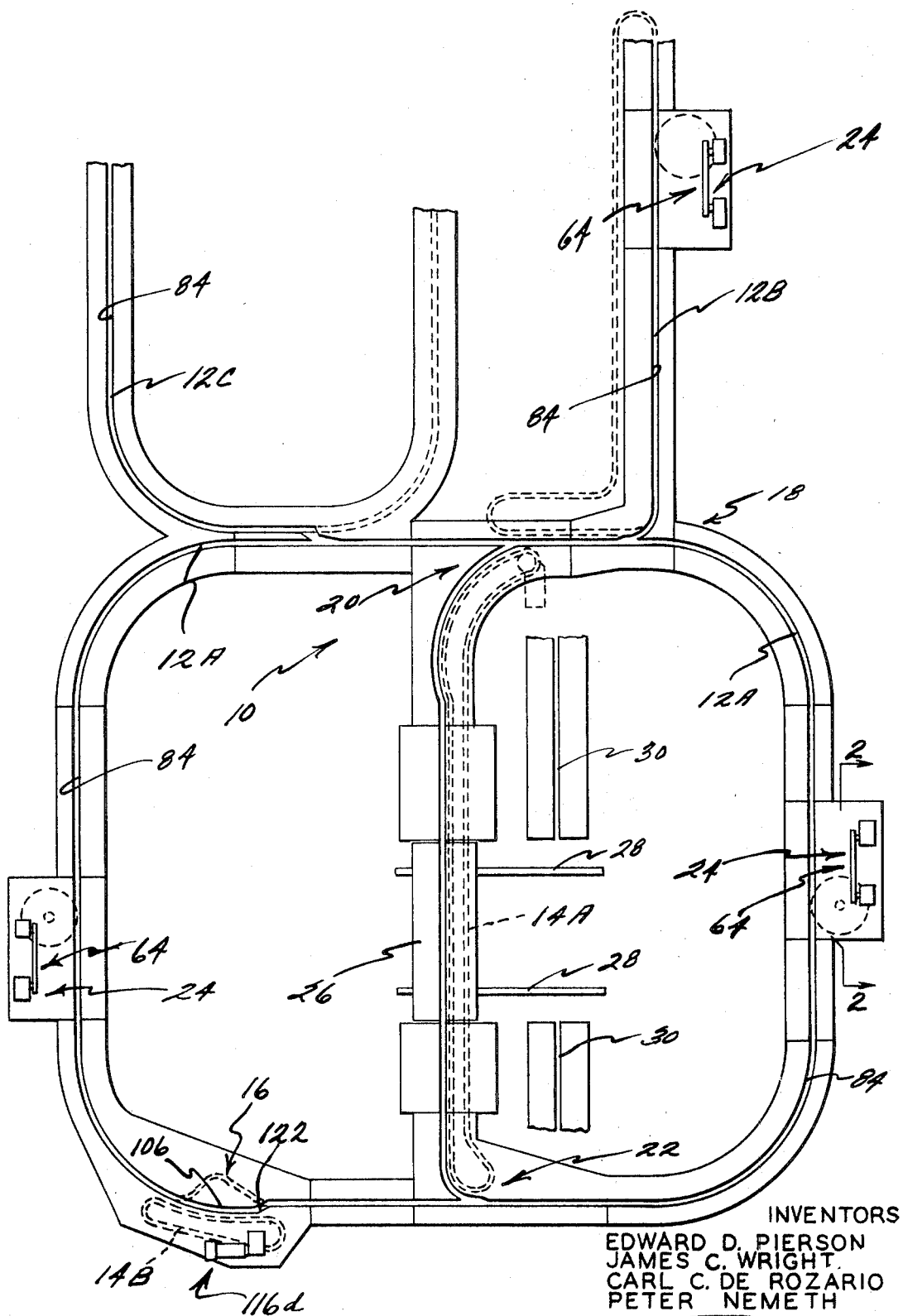
FIG. 1 is a top plan view showing a typical subfloor chain conveyor system of a type embodying the various novel features of the present invention.

Referring now to the drawings for a detailed description of the present invention and, initially, to FIG. 1 for this purpose, reference numeral 10 has been chosen to designate the entire subfloor chain conveyor system in a general way while reference numeral 12 similarly identifies the primary chain loops and 14 the secondary chain loops. For purposes of further identification, reference numeral 12A has been used to identify one of the primary chain loops and 12B and 12C other primary chain loops such as would be used to bring loaded dollies into primary chain 12A from a loading dock or return same to a warehouse or other facility. Similarly, reference numeral 14A identifies a secondary chain spur loop that cuts across the main primary chain loop 12A bypassing a portion thereof while numeral 14B has been used to designate an independent secondary chain transfer loop having as its sole function the movement of the dollies across the unoccupied section of main slotted track where the primary chain 12A has been rerouted over the slack takeup mechanism identified broadly by reference numeral 16. Reference numeral 18 refers broadly to the crossover subassembly that controls the transfer of the dollies from primary chain loop 12B to primary chain loop 12A. Numerals 20 and 22 have been similarly selected to generally designate the intersections at the intake and discharge ends of secondary chain loop 14A where it leaves and returns to primary chain 12A. Reference numeral 24, on the other hand, refers broadly to the pair of identical sprocket drive subassemblies that drive the primary chain 12A as well as the other primary chains, another having been shown on chain 12B.

The remaining features to be seen in FIG. 1 are the movable track section 26 of the spur 14A, the rails 28 upon which it moves transversely of the spur track, and the siding track sections 30 onto which the dollies are side-tracked and stored for return to the main line as needed. With such a storage area, it becomes possible to keep partially used rolls readily available in the immediate vicinity of the presses so that they can be returned to the system whenever a need therefor arises.

Figure 2:
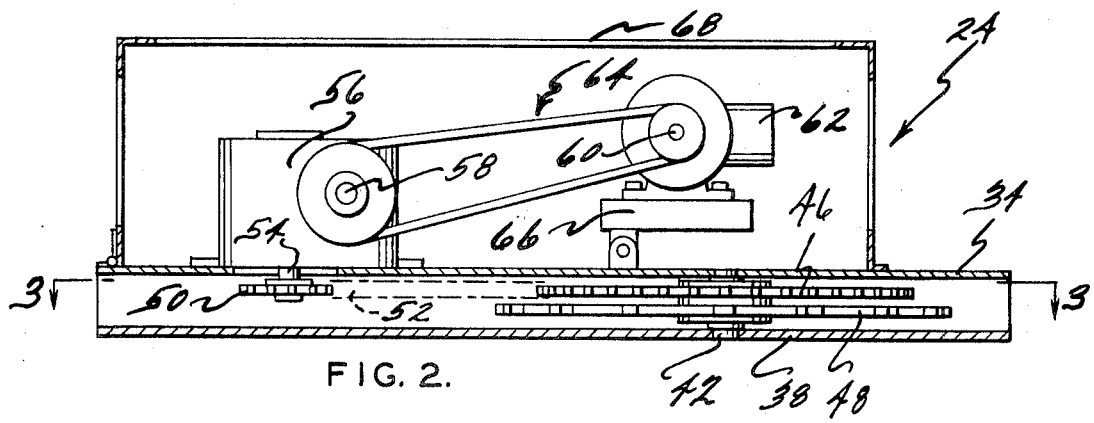
FIG. 2 is a section taken along line 2—2 of FIG. 1 and greatly enlarged, showing the details of one of the two primary chain drives.
Figure 3:
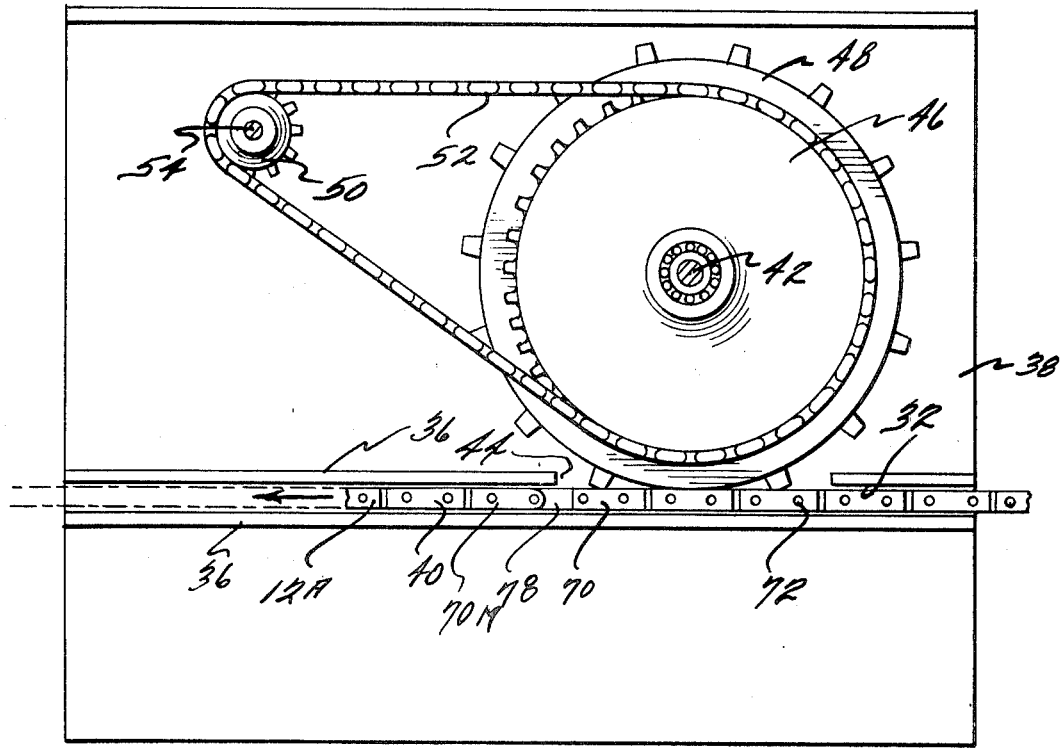
FIG. 3 is a horizontal section taken along line 3—3 of FIG. 2 to the same scale.

The attention is next directed to FIGS. 2 and 3 for a more detailed look at the drive 24 for the primary chain loops 12A, 12B and 12C. An upwardly opening track 32 is formed beneath the floor plates 34 by means of spaced parallel rail members 36 and a horizontally disposed plate 38 that closes the underside thereof and forms a supporting surface over which chain 40 slides. A vertical shaft 42 is fastened between the parallel floor and subfloor plates 34 and 38 displaced to one side of an opening 44 in the adjacent rail wall 36 and this shaft journals a pair of sprockets 46 and 48 that are connected to one another for conjoint rotation thereon. The sprocket teeth of lower sprocket 48 extend through opening 44 into the chain track 32 and mesh with the main sprocket chain 40. The upper sprocket 46 is connected in driving relation to another sprocket 50 by means of drive chain 52. The latter sprocket is fastened to drive shaft 54 of a combination overrunning one-way clutch and speed reduction mechanism 56 which is mounted in a common housing atop the floor plate 34 with its shaft extending downwardly therethrough. The input shaft 58 (FIG. 2) of the combination clutch and gear reducer is connected to the output shaft 60 of gear motor 62 by a belt and pulley drive identified in its entirety by numeral 64. The overrunning one-way clutch can, of course, be located anywhere in the drive 24. The gear motor has been shown mounted on a so-called "Rockwood" motor mount 66 adapted to maintain the belt under constant tension.

As has already been mentioned in connection with FIG. 1, two such main chain drive mechanisms 24 are preferably used, located as shown in opposite extremities of the system. The purpose of the overrunning one-way clutches 56 is to prevent the chain from back-driving the gear motor 62 if one of the latter should break downs. The portion of this drive mechanism that lies above the floor is shown covered by a hinged housing 68.

Figure 4:
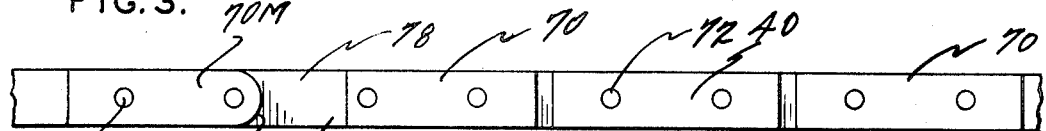
FIG. 4 is a further enlarged fragmentary top plan view of the primary chain showing the adjacent foreshortened links that define the gap adapted to receive the retractable dolly pin.
Figure 5:
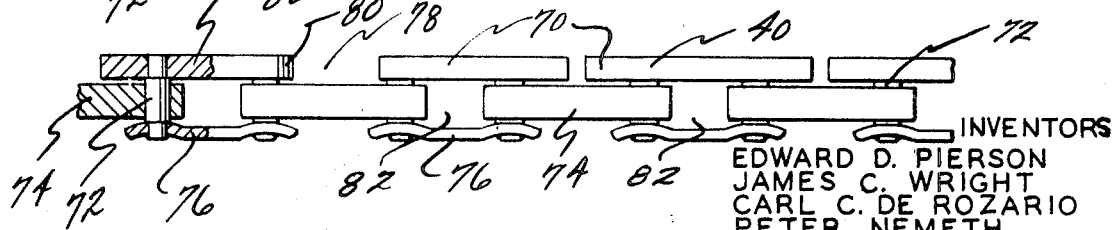
FIG. 5 is a fragmentary side elevation of the primary chain with portions thereof broken away and shown in section.

The main chain 40 used on the primary loops 12A, 12B and 12C is most clearly revealed in FIGS. 4 and 5 to which reference will now be made. The main links 70 each carry a pair of downwardly extending pins 72 arranged adjacent opposite ends thereof in spaced substantially parallel relation to one another. The connecting links 74 have apertures in the opposite ends thereof adapted to pass the pins on the adjacent ends of a pair of adjoining main links and provides for relative pivotal movement therebetween about essentially vertical pivot axes. These main and connecting links are held together in assembled relation by links 76 that receive the ends of the pins projecting beneath the connecting links and hold onto same by reason of their being upset to provide a head.

The aforementioned chain structure is, of course, conventional; however, there are two features of the chain that make it different from the prior art subfloor conveyor chains. The first of these is that the chain 40 runs in the subfloor rack 32 provided therefor with its pivot pins extending vertically as shown in FIG. 3 rather than horizontal as is usually the case. By so doing, the chain can be moved around short radius curves much more easily than a chain laid with its pivot pins extending horizontally.

The second feature is the provision of a gap 78 between selected pairs of adjacent main links 70 formed by foreshortening one link of said pair 70M and rounding off the end of the latter as shown at 80 instead of using the gap 82 between adjacent connecting links 74 as a connection point. These gaps 78 are provided at longitudinally spaced intervals along the main chain 40 whenever the latter is used as a primary chain. As far as spacing is concerned, these gaps must be spaced apart at least the length of the dollies plus whatever additional space is needed to enable two or more such dollies in adjacent gaps to turn the corners. These gaps are, of course, exposed through the slot 84 left between the floor plates that opens above the chain and exposes the latter as it runs in its track 32.

Long primary chain loops are best provided with a slack takeup system and a unique subassembly 16 for this purpose has been shown in FIGS. 6, 7 and 8 to which reference will now be made. As the main chain enters the corner where the takeup subassembly is located, it leaves rail 36 on the inside of the turn and passes onto a loop of roller chain 86a reaved around three upstanding curved guide members 88a, 90a and 92a which, in the particular form shown, comprise shallow cylindrical rings underneath the floor plates. Roller chains such as this allow the primary chain to run freely around the corners without dragging heavily against the rail 36 on the inside of the curve. A pair of like guide members 88b and 92b carry another roller chain loop 86b at the discharge end of the corner and support the main chain 12A on the inside of the curve in the absence of the inside rail 36. In between fixed guide members 92a and 92b is a third adjustable guide element 92c encircled by yet another roller chain loop 86c. The main chain passes, as shown, from the outside of guide member 92a, around the inside of guide 92c and back onto the outside again over guide members 92b, all of which interpose roller chain loops (86a, 86c and 86b) therebetween. Guide member 92c is adjustable horizontally along a line passing between guide elements 92a and 92b so as to take up the slack in the main chain as shown. This adjustment is provided by means of parallel slotted plates 94 on the bottom of the ring that forms movable guides 94c, bolts 96 threaded into the subfloor 38 through these slots, and a jackscrew subassembly including a jackscrew 98 threaded through a stationary nut 100 welded onto the subfloor that pushes against a bearing plate 102 on the inside of the ring. A locknut 104 on the jackscrew holds the movable guide ring 92c in adjusted position.

Now, in order to haul the dolly across the gap 106 left when the main chain 12A leaves the track to have the slack taken therefrom, still another endless roller chain loop 86d is used. The latter chain is reaved around a guide member 88d similar in design to those already described but of a slightly different size in the particular form illustrated, along the outside of outer rail section 36d and inside a short rail section 110d cooperating with the latter to define a parallel-walled channel 112d for said chain, and around sprocket 114d of a roller chain drive that has been broadly referred to by reference numeral 116d. Chain 86d has a pair of dogs 118d fastened to the top thereof at longitudinally spaced intervals so as to run along the top of outside rail 36 and project over into the main chain track 32. These dogs move with the chain along underneath the slot 84 and engage the retractable dolly pin 120 in the manner shown in FIGS. 6 and 7 so as to push the dolly ahead thereof across gap 106. Toward the discharge end of gap 106, the slot 84 and has a jog in it as illustrated at 122 in FIG. 1. The dolly pin 120 continues to follow slot 84 and the inside of outer rail 36d until it strikes dogleg switch arm 124d and pivots it into the broken line position of FIG. 6 against the bias exerted upon the latter by compression spring 126d located on push rod 128d that slides within the aperture in spring abutment 130d. As the dolly pin 120 pushes the dogleg switch arm aside, it leaves pin pickup dog 118d which, in turn, leaves rail 110d and turns the corner formed by the latter thus allowing the pin to coast to a stop against abutment 132d where it remains alongside the main chain 12A until a vacant pin-receiving gap 78 comes along. Note that the outer rail section 36d of the main track becomes the inside rail of the roller chain loop 86d at the point where the main chain leaves the main track 32. At the point where the main chain 12A is returned to the main track adjacent the discharge end of the slack takeup subassembly 16, the outer main chain rail 36d does not resume its function of confining the main chain, but instead, continues to confine the roller chain loop 86d on the inside until it reaches the corner whereupon it terminates. The main outer rail 36 begins again at the end of gap 106 and, once again, resumes its function of providing the outside guide for the main chain as it returns to the main track.

The function performed by the roller chain loop 86d in moving the dolly across the gap 106 in the main track and returning it to the main chain can best be described in connection with FIG. 6 to which reference will not be made. As the dolly pin moves along the main track 32 and enters the area where the takeup assembly is located, it will impinge upon dogleg switch arm 134d of a pin-sensing switch subassembly 135d that overhangs the main chain 12A. All empty pin-receiving gaps 78 in the main chain will pass beneath the switch arm 134d without actuating same or energizing the drive 116d for roller chain loop 86d; however, as soon as one of these pin gaps is occupied by a pin 120, it will move the switch arm aside and actuate the pin-sensing switch 136d into closed position thus starting the drive motor 62d. Energization of the drive 116d will, in turn, start the roller chain 86d moving clockwise as seen in FIG. 6 which will momentarily move pin dog 118d off of normally open switch 138d so as to release same into its closed position operative to keep the drive motor 116d running as the switch arm 134d is released to its full line position where it reopens switch 136d. Dog 118d will continue to move around the loop until it picks up the dolly pin 120 waiting in the gap 106 and moves it across the latter. As the dog completes its excursion, it will, once again, strike the arm of switch 138d and reopen same to shut down drive motor 62d until another dolly comes along and actuates switch 136d. The latter switch is, of course, normally biased into the full-line position of FIG. 6 by biasing subassembly 140d.

Once the dog 118d has delivered the dolly to a position where its pin 120 rests against abutment 132d, it will await the return of the gap 78 in the main chain that it originally occupied. The dolly pin's movement is timed relative to the gap such that the pin arrives ahead of the gap and pushes dogleg switch arm 124d aside. The latter is, however, continuously biasing the pin 120 against the top links 70 of the main chain over the top of rail 36d and, as soon as the gap 78 arrives, it will push the dolly pin back into said gap. Obviously, the roller chain loop 86d could, if desired, be synchronized to reinsert the pin in the gap in the main chain without having to rely upon the dogleg mechanical switch to do this after the pin arrives slightly ahead of schedule; however, it is equally apparent that an adjustment in the movement of the pin dog 118d would have to be made corresponding to each slack takeup adjustment as the latter effects the time interval it takes for gap 78 to leave and return to the main track 32. Accordingly, the structure shown is considered to be more practical and a good deal less complicated insofar as precise timing is concerned.

Figure 22:
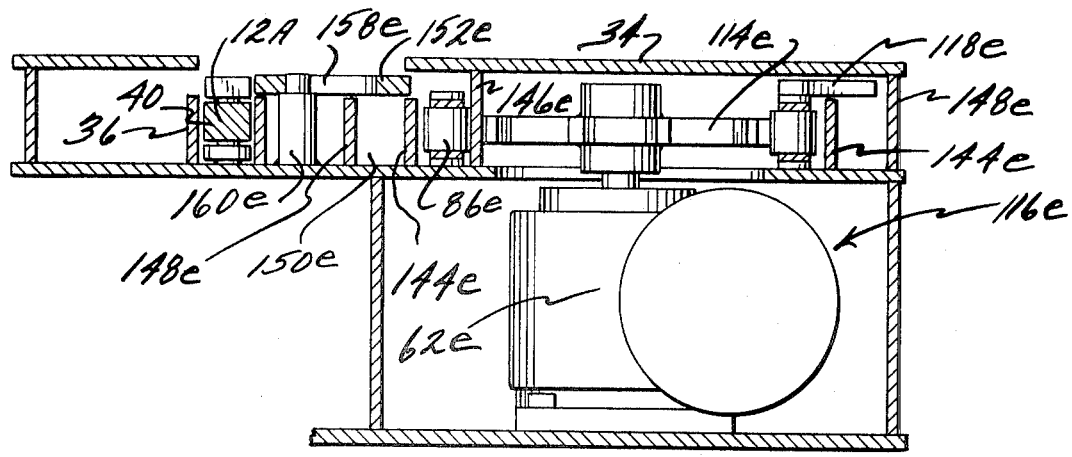
FIG. 22 is a fragmentary section taken along line 22—22 of FIG. 9 showing the sprocket drive for the secondary chain loop of FIGS. 9-13.

Particular reference will now be made to FIGS. 9 and 10 for a detailed description of the switch subassembly 20 by means of which the dollies are taken from the primary chain loop 12A and switched on to secondary chain loop 14A. A roller chain loop 86e is reaved around a drive sprocket 114e connected to a self-contained right angle gear motor drive 116e to be described in detail presently in connection with FIG. 22. Across the layout from drive sprocket 114e is a stationary generally J-shaped guide member 142e revealed in FIGS. 11, 12 and 13 around which the roller chain 86e is also reaved with middle and inner track-forming rail members 144e and 146e guiding the runs of the roller chain therebetween. An outer track-forming rail 148e cooperates with the middle rail 144e to define a siding pin track 150e alongside the roller chain track.

A switch plate 152e is mounted for horizontal pivotal movement about pivot 154e between the inoperative full-line position of FIG. 9 lying alongside the main chain track and the broken line operative or switched position overlying the latter whereby the leading edge 156e thereof cams the dolly pin 120 from said main track off onto the siding pin track 150e. Switchplate 152e includes an arcuate slot 158e and cooperating stop pin 160e that limit the angular swing thereof between its inoperative and operative positions. The switchplate has an arm portion 162e projecting beyond the pivot 154e on the opposite side thereof from slot 158e against which is seated the end of compression spring 164e that normally biases said switchplate into its inoperative or retracted full-line position. This spring is confined within a tubular housing 166e containing an adjustable spring abutment 168e. Both the inner and outer rails 36 of the main track 32 and the outer rail 148e of the siding pin track 150e are lowered as indicated at 170e to accommodate the switchplate beneath the floor plates.

At spaced intervals on the roller chain are provided camplates 172e followed at a short distance therebehind by a pin pickup or push plate 118e like that used in the slack takeup subassembly of FIG. 6. Both of these plates ride along the top edge of middle rail 144e and project overwell into siding pin track 150e. The camplate has a rearwardly inclined leading edge 174e positioned and adapted to engage the corresponding leading edge 156e of the switchplate 152e and move same from its inoperative into its operative position in advance of the dolly pin 120 reaching same. Camplate 172e holds the switchplate 152e in its operative broken line position of FIG. 9 until the pin pickup dog 118e comes along and pushes the dolly off onto the spur line a distance sufficient to clear another dolly moving past on the main line. The pin-sensing subassembly indicated in a general way by reference numeral 135e in both FIGS. 6 and 9 is located ahead of the intersection and is connected in a circuit including the drive for sprocket 114e. A passing dolly pin becomes operative to close the normally open switch 136e of this pin-sensing subassembly so as to start the roller chain 86e moving. Since not all dollies are to be shunted off onto the spur line, it is best to connect another switch (not shown) in series with switch 136e of the pin-sensing mechanism 135e shown in FIG. 9 so as to provide means for opening the circuit to the secondary chain drive when one wishes to bypass switch 152e. In any event, switch 136e actuates into closed position only momentarily and a second normally closed switch 138e must be connected in parallel therewith to keep the drive running until the dolly clears the main chain. This switch 138e is reopened by a second camplate 172e coming along to actuate same and stop the drive (116e in FIG. 22), after the "switched-out" dolly has cleared the intersection. Several sets of these cam and push dogs 118e and 172e are provided at intervals along the spur chain spaced apart far enough to accept a train of dollies in end-to-end spaced relation to one another.

Figure 11:
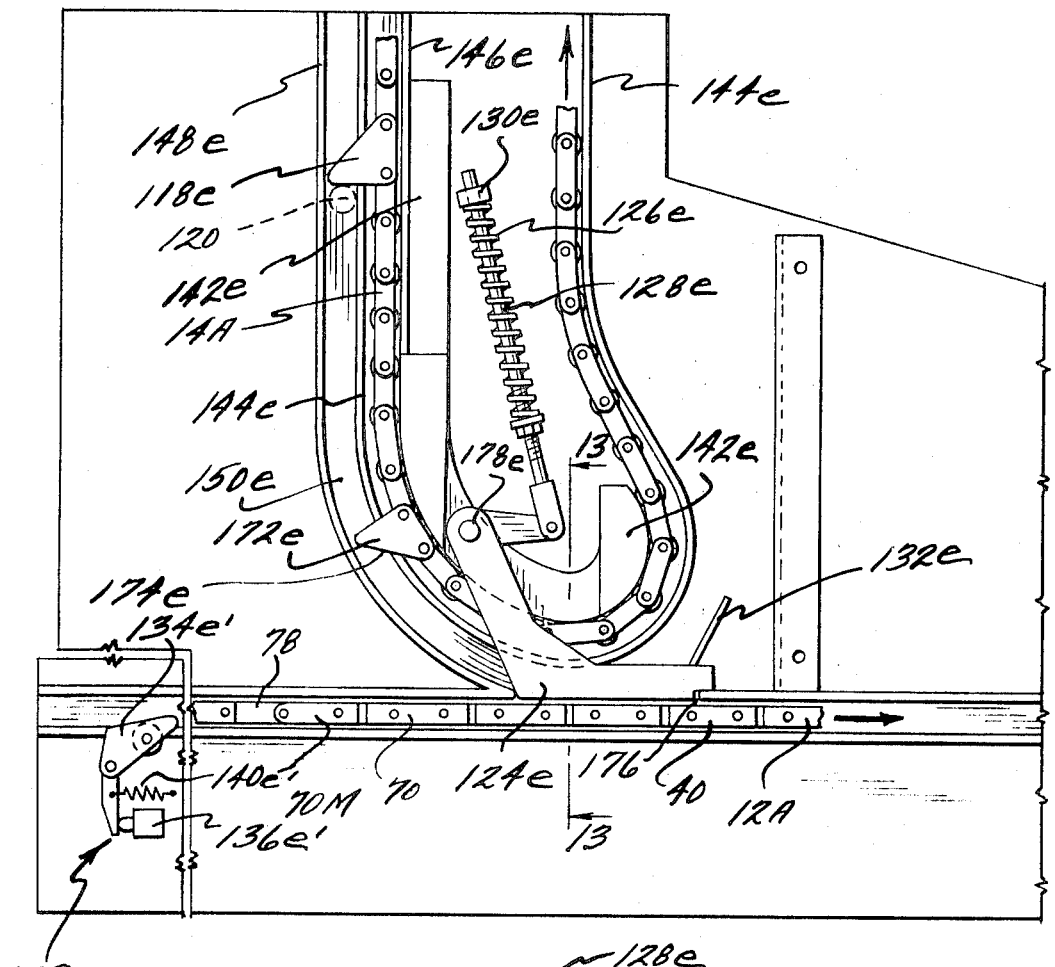
FIG. 11 is a fragmentary top plan view with the floor plates removed showing the return switch subassembly used with the bypass switch of the preceding figures in a secondary chain loop to return the dollies to the primary chain loop.
Figure 12:
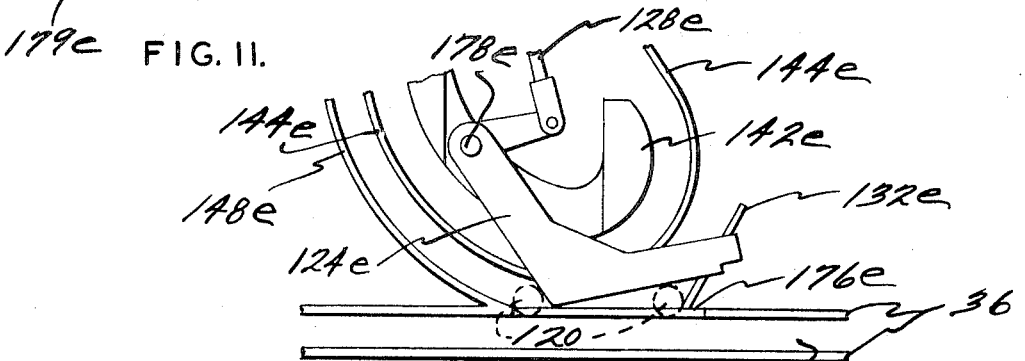
FIG. 12 is a further fragmentized top plan view similar to FIG. 11 except that the switch arm is shown in actuated position holding the retractable dolly pin in position to enter an open gap in the primary chain.
Figure 13:
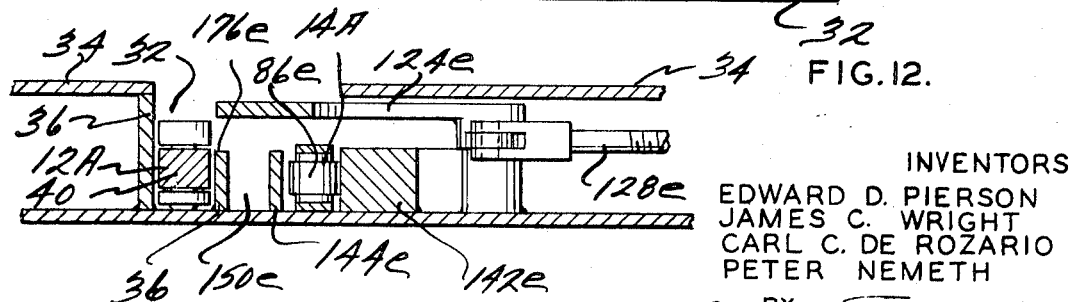
FIG. 13 is a fragmentary section taken along line 13—13 of FIG. 11.

FIGS. 11, 12 and 13, to which reference will now be made, reveal the switch subassembly 22 by means of which a dolly is returned to the primary chain 12A from the secondary chain 14A. The outer track-forming rail 148e merges into the inner rail 36 of the main track just ahead of the elongate notch 176 cut in the latter through which the pin passes as it reenters the main line 12A. Essentially, the mechanism for returning the dolly to the main line is the same as that previously described in connection with FIG. 6 for this same purpose. The pin pickup dog 118e pushes the pin against dogleg crank 124e thus swinging it inwardly out of the way about its pivot 178e so as to permit the pin to move therepast along the inside of the moving main chain 40 until it strikes pin abutment 132e. In the meantime, the dolly pin 120 has moved on forward out of engagement with the pin pickup dog so that the latter can move on past therebehind. The compression spring 126e acts as before against an abutment on push rod 126e so as to withdraw same from the aperture in fixed abutment 130e thereby forcing the dogleg crank against the pin in a direction to move the latter against the top links 70 of the main chain until a gap 78 appears therein at which time said pin will reenter the main chain loop 12A and leave the secondary chain spur.

Figure 16:
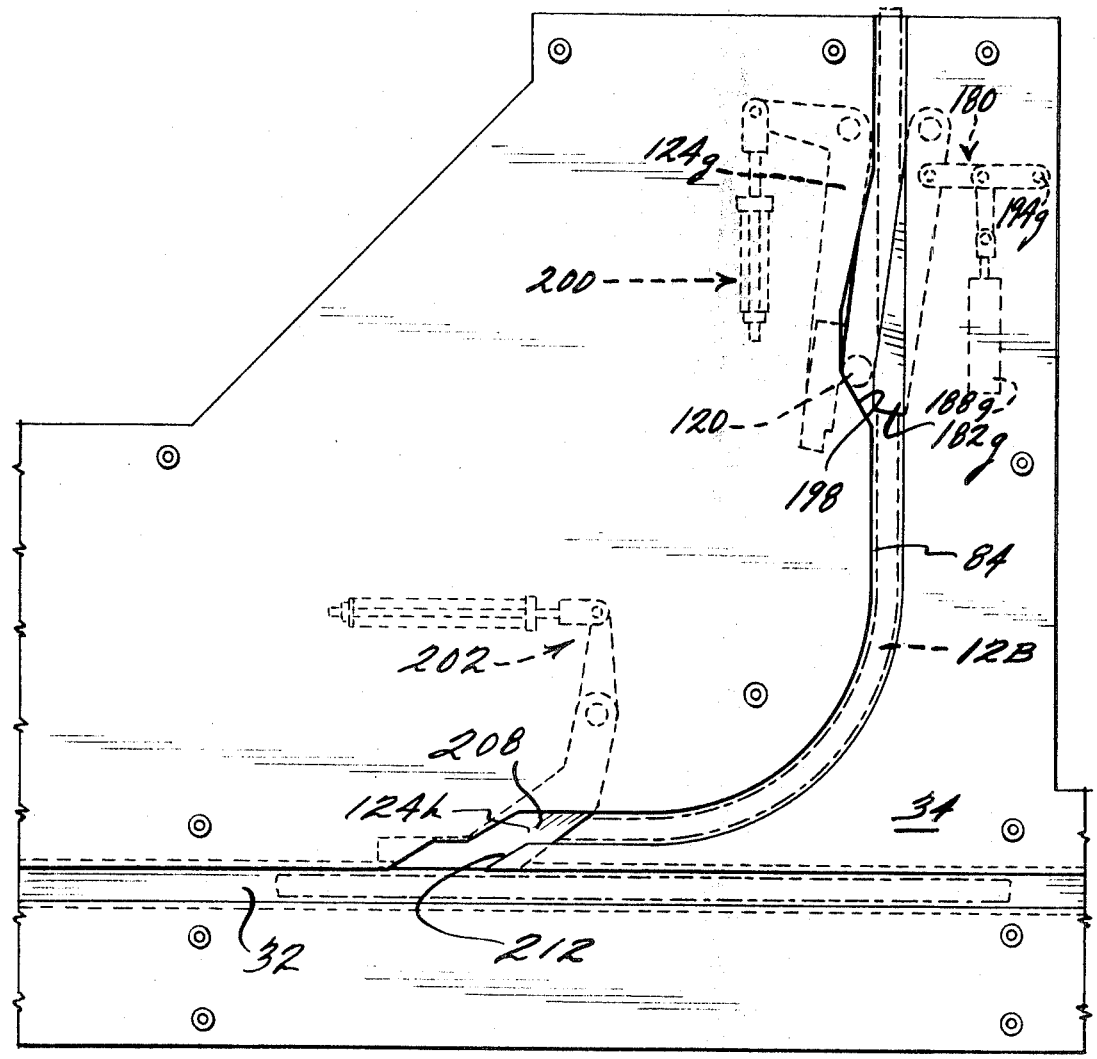
FIG. 16 is a fragmentary top plan view similar to FIG. 14 except that the floor plates are in place and the accumulator switch subassembly is actuated into its "holding" position.
Figure 17:
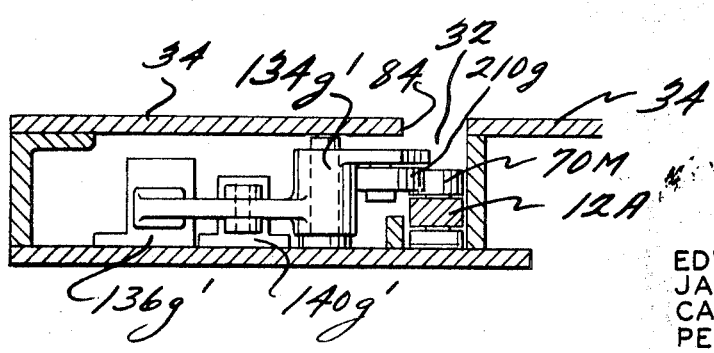
FIG. 17 is a fragmentary section taken along line 17—17 of FIG. 15 showing further details of the gap-sensing switch.

Now, before the dolly pin can be moved into position adjacent the primary chain preparatory to entering an open gap therein, it must first be determined that such a gap exists, otherwise, a dolly on the main chain would collide with one waiting to enter the latter at the terminal end of the spur. Accordingly, a gap-sensing subassembly generally indicated by reference numeral 179e and soon to be described in detail in connection with FIG. 17 is located ahead of the intersection as shown somewhat schematically in FIG. 11. The normally closed switch 136e' of this subassembly is connected to the drive (116e in FIG. 22) for the sprocket 114e of the spur chain and is released into closed position by the passage of an open gap. Momentary closure of this switch will start the secondary chain 14A moving thus releasing normally closed switch 138e (FIG. 9) into its closed position so that the dog 118e will push a dolly on to the end of the spur in position to enter the open gap previously detected. FIG. 1 shows how the dollies can be taken from the spur and stored so there is no reason for one returning to the main line inadvertently due to actuation of the secondary chain 14A to take another off while one is waiting. Before proceeding with a description of the crossover subassembly of FIGS. 14–17, inclusive, brief reference will be made to FIG. 22 where the drive for the roller chain 86e on the spur line has been illustrated. In major essentials, it is just like the drive 116d (FIG. 8) for the other roller chain 86d except that, in the particular form illustrated, a slightly larger gear motor 62e is mounted in a recessed cavity beneath the floor rather than on top thereof so as to clear the intersection on the exposed surface of the floor plates for the passage of the dollies. Since gear motor 62d of drive assembly 116d (FIG. 8) offers no obstruction to the movement of dollies across the gap, there is no need to recess it beneath the floor and by placing it on the surface it is less likely to overheat and is more easily serviced.

Next, with reference to FIGS. 14–17, inclusive, the dolly crossover subassembly 18 will be described, the latter being of the type used to transfer the dollies between parallel runs of continuously moving main chains 12A and 12B. The outside dolly delivering run of primary chain loop 12B passes around a roller chain loop 86f reaved about an upstanding stationary rail 108f similar in shape and design to rail 108d used to guide the roller chain of the slack takeup mechanism shown in FIG. 6. As the chain 12B leaves the corner, it passes around chain loop 86f' that encircles an adjustable guide member subassembly 92f like that of FIG. 6 identified by reference numeral 92c. Corresponding parts of subassembly 92f have been given the same reference numerals followed by the letter "f" as the one shown in FIG. 6 and they need not be further described. After passing around the adjustable roller chain guide 92f, the inside or return run of the chain passes inside another roller chain loop 86f'' encircling a stationary guide member 92f''. As the return run leaves guide member 92f'', it is guided into rails 36 as shown in FIG. 14. Another roller chain loop and guide member like that just described would be placed at the terminus of the return loop although it has not been illustrated.

Just prior to the forward or dolly carrying run of the primary chain 12B entering the corner, it passes between the elements of a dolly holding subassembly which has been identified in a general way be reference numeral 180. A switch arm 182g is pivotally attached alongside the outside rail 36 for pivotal movement within notch 186g (FIG. 14) cut in the top edge thereof out over chain track 32. A pneumatic servomotor 188g is mounted alongside the switch arm 182g with its piston rod 190g connected to the midpoint of toggle 192g. Opposite extremities of the toggle are pivotally connected, respectively, to the bed plate (194g) and to the switch arm (196g). Upon actuation of the servomotor, the toggle links move from their angularly disposed dogleg relation of FIG. 14 into the essentially straight-line relation of FIG. 16 thus extending the "-switch" arm 182g over the track 32 where it engages the dolly pin 120 and moves it aside out of gap 78 in the chain into neutral area 198 (FIG. 16). To do so, the pin 120 must actuate the automatic return switch mechanism that has been indicated in a general way by reference numeral 200 and which comprises nothing more than another dogleg switch arm 124g similar in design and identical in operation to the switch arms 124d and 124e of FIGS. 6 and 12 that have already been described in considerable detail. Accordingly, like reference numerals followed by appropriate letters have been used to identify the various elements of switch subassembly 200 as well as still another such assembly 202 that will be referred to presently.

The bias exerted upon "switch-in" arm 124g by compression spring 126g acts in a direction to push pin 120 against the side of the main chain 12B and, particularly; the top links 70 thereof. Of course, as long as servomotor 188g remains actuated, the switch arm 182g blocks the return of the dolly pin to a gap 78 in the chain 12B as is clearly shown in FIG. 16. Of course, if no dolly is present, the switch arm 124g will remain in its unactuated position shown in FIG. 14 even through its companion switch arm 182g is actuated into its FIG. 16 position ready to move the next dolly pin that comes along off onto the siding. A position-sensing switch 204g is located alongside the "switch" arm 124g in position to be actuated thereby when a pin 120 is present and has moved it aside. This switch, of course, can be used to signal an operator that a dolly is "holding" on the siding so that another dolly will not be released or, alternatively, to automatically energize some sort of gate (not shown) that prevents the introduction of another dolly into the primary chain loop 12B until such time as the previously introduced dolly has left the holding station. Once the switch arm 182g has been retracted into its inoperative position shown in FIG. 14, however, the switch arm 124g becomes automatically operative to return the pin 120 to the first open gap 78 in the chain 12B that comes along.

A gap-sensing subassembly broadly designated by reference numeral 179g identical to that shown in FIG. 11 and which has already been described in considerable detail is used to locate open gaps 78 in the main chain 12A. On the other hand, a pin-sensing subassembly 135g is located upstream of the holding subassembly 200 with the switch 136g thereof connected in parallel with normally closed switch 204g that is actuated by switch arm 124g whenever a dolly is "holding." These switches 136g and 204g cooperate to prevent a second dolly from entering the holding subassembly while one is still there. This may be done by shutting down the drive to chain 12B until the situation can be remedied or, preferably, to set the second dolly off on another holding station like that shown at 200 until the first one clears. The gap-sensing subassembly 179g is located in the main line upstream of switch subassembly 202 so as to locate gaps in the primary loop 12A.

Now, once the switch arm 182g has been retracted to its FIG. 14 position and the switch arm 124g has pushed the dolly pin 120 back into an open gap in the primary chain 12B, the dolly will be moved thereby on around the corner until it strikes dogleg switch arm 124h of switch subassembly 202 which, in this instance, performs the combined functions of removing the pin 120 from primary chain 12B and inserting said pin into the next open gap 78 in chain 12A. Upon being struck, the switch arm 124h will move aside and allow the pin 120 to move through the generally Z-shaped "jog" 208 (FIG. 16) in the slot 84 defined between the sections of floor plate 34. The reason for the "jog" is, of course, to prevent the switch arm 124h from backing up the dolly pin 120 and reinserting same into another open gap 78 in the primary chain 12B instead of on forwardly into the primary chain 12A. The forwardly inclined trailing edge 212 of the Z-shaped opening provides a stop against which arm 124h presses the dolly pin 120 until a gap 78 comes along in chain 12A for the latter to enter. Once again, the arm subassembly 202 includes the compression spring 126h, fixed apertured abutment 130h, pushrod 128h, etc., which are common to the other spring-activated arm subassemblies previously described.

Gap-sensing subassembly 179g is most clearly shown in FIGS. 15 and 17 and, once again, will be seen to include substantially the same elements as the pin-sensing subassembly 179e shown in FIG. 11 including the fact that the dogleg switch arm 134g' carries a roller 210g on the underside thereof in position to roll along the adjacent edges of the top links 70 and 70m of the primary chain 12A due to the bias exerted thereon by spring biasing subassembly 140g'. Normally closed switch 136g' is held open by the switch arm 134g' until an unfilled gap 78 appears in the chain 12A, whereupon, the bias exerted upon said switch arm by the biasing means 140g' causes the roller 210g to enter the gap thus momentarily allowing the switch to return to its closed position. When this switch closes, it deenergizes servomotor 188g and permits spring-biased switch-in arm 124g to move into the next open gap 78 in the primary chain 12B for movement around the corner ready to enter the previously located gap 78 in the other primary chain 12A that actuated the switch in the first place. Of course, any gap 78 in the chain 12A that is occupied by a dolly pin 120 will act against the roller 210g of switch arm 134g' so as to keep the switch 136g' open.

The crossover subassembly described above is used to insert dollies into the primary loop 12A while the holding subassembly 200 is used whenever it becomes necessary or desirable to stop a dolly while an intersection, crossover or other holding station ahead thereof clears without having to stop the chain.

FIGS. 18–21, inclusive, to which reference will now be made indicate another type of crossover switch subassembly 216 such as might be used as shown in FIG. 1 to transfer a dolly between parallel runs of primary chains 12A and 12B. Functionally, therefore, it is similar to crossover switch 202 just described although it differs therefrom mechanically. Dogleg switch arm 218i is located alongside primary chain 12A for movement from a fully retracted position alongside thereof as shown in FIG. 18 to a partially extended position shown in FIG. 19 where it switches a dolly pin out into the neutral area 220 between chains 12A and 12C, and from the above-described partially extended position to the fully extended one shown in FIG. 20 where it is adapted to push the dolly pin out of the neutral area into an open gap in chain 12C.

This switch arm 218i is actuated by a servomotor 222i which, in the particular form shown, comprises a double-chambered cylinder mounting two pistons in end-to-end relation. Such pneumatic servomotors are commercially available and one like that shown herein is more fully illustrated and described in U.S. Pat. No. 3,490,573 (FIGS. 9 and 10) to which reference can be made for additional details if such are needed. For purposes of the present description, it should suffice to point out that retraction of the piston 224i in the front chamber 226i with the piston (not shown) in the rear chamber 228i extended will shift the switch arm 218i from its fully retracted position of FIG. 18 into its partially extended position of FIG. 19. Next, actuation of the piston in the rear chamber 218i into its retracted position will retract piston rod 224i all the way and shift switch arm 218i from its partially extended position of FIG. 19 into its fully extended position of FIG. 20.

Now, it is significant to note that in the crossover subassembly of FIGS. 18–21 in contrast to that of FIGS. 14–17 just described, the dolly pin is positively shifted from the neutral area 220 across over onto chain 12C whether a gap 78 is there or not. Accordingly, provision must be made to insure the presence of an open gap in chain 12C arriving at the crossover at the exact instant the pin is shifted. To do this, a pin-sensing subassembly 135i like that already described is located alongside primary chain 12A with the normally open switch 136i thereof connected to the front chamber 226i of the servomotor 222i. Momentary actuation of switch 136i of the aforementioned pin-sensing subassembly is sufficient to actuate the servomotor and shift arm 218i into the intermediate or partially extended position of FIG. 19 where it will move the sensed pin out of the gap in the main chain 12A into the neutral area 220 awating the arrival of an open gap in chain 12C.

Chain 12C, on the other hand, is provided with a slightly modified gap-sensing subassembly 179i which differs from the gap-sensing subassemblies 179e and 179g already described in that it includes a time-delay switch 136i. This switch is of the normally closed type held open by chain 12C moving therepast until an open gap appears, whereupon, it closes after the lapse of a preset time-delay of an interval that permits the sensed gap to move on to a position directly alongside the dolly pin waiting therefor in the neutral area of the crossover. Once this switch 136i' times-out, it instantly dumps the air pressure from the rear chamber 228i of the servomotor 222i thus permitting the piston rod 224i to fully retract into the FIG. 20 position where the where the switch arm positively pushes the dolly pin over into the sensed gap 78 in chain 12C.

In addition to the positively actuated switch arm 218*i* described above, the crossover subassembly includes still another spring biased switch subassembly 200*i* that is mechanically much like that of subassembly 200*g* of FIGS. 14 and 16 although it performs an additional function. When the switch arm 124*i* thereof moves from its fully extended position of FIG. 18 into the partially retracted one of FIG. 19 in response to the movement of a dolly pin into the neutral area 220 by means of a partial extension of switch arm 218*i*, it is performing the exact same function as that of switch arm 124*g* in FIGS. 14 and 16 except that it never returns the dolly pin to chain 12A; but, instead, it moves on back from the partially retracted position of FIG. 19 into the fully retracted one of FIG. 20 as soon as the pin moves into the open gap in chain 12C. It, of course, remains in the fully retracted position of FIG. 20 only an instant and then returns immediately to the fully extended position of FIG. 18 awaiting another dolly pin entering the neutral area 220. Note that with the switch arm 218*i* partially extended as shown in FIG. 19, spring-biased arm 124*i* will remain fully extended as in FIG. 18 until a pin moves into the neutral area therebetween.

Normally open switch 204*i* senses the movement of switch arm 124*i* from its fully extended into either its partially retracted or fully retracted positions, therefore, when closed, it indicates the presence of a dolly within the intersection. Closure of this switch would ordinarily be used to actuate a holding subassembly like that shown in FIGS. 14 and 16 located on the main chain loop well ahead of the crossover. If, as already described in connection with FIGS. 14 and 16, a dolly pin was already present in the neutral area 220 of the crossover, switch 204*i* would actuate servomotor 188*g* to shunt the next dolly off onto a siding until the crossover cleared. Deactuation of switch 204*i* in response to a return of switch arm 124*i* to it neutral position can be employed to actuate servomotor 222*i* into the position of FIG. 18 where the switch arm 218*i* controlled thereby is fully retracted.

Finally, reference will be made to FIGS. 23–29, inclusive, for a detailed look at the dolly itself which has been identified broadly by numeral 230. It includes a horizontal platform 232 supported for rolling movement on a transversely spaced pair of fixed wheels 234 at the rear end thereof and a pair of caster wheels 236 at the front. The platform has a central opening 238 therein that journals the pin 240 of a turntable 242 for rotation atop thereof about a vertical axis. A ball race 244 provided with ball bearings 246 mounts atop the platform in concentric relation to the pin axis and supports the platform so that it will turn freely.

Across the rear end of the dolly extends a foot-pedal-operated spring latch subassembly indicated in a general way by numeral 248 and which is used to releasably latch the turntable in fixed position relative to the platform.

The underside of the platform is provided with a pair of cam-type latch plates 250, one at each end along the longitudinal centerline thereof. Each of these latch plates includes a pin-receiving socket 252 in the center thereof bordered on both sides by inclined cam surfaces 254 leading up thereto and positioned to engage and retract the spring-biased latch pin 256.

Underneath platform 232 is bolted a tubular latch pin housing 258 having a transversely extending channel-shaped pedal guide 260 closing the bottom thereof except for an aperture 262 (FIG. 29) adapted to pass the shank 264 of the latch pin. A larger opening 266 is provided in the platform adapted to pass the tapered head 268 of the latch pin. A downwardly facing shoulder 270 separates the shank and head of the latch pin and cooperates with the channel-shaped guide member 260 to provide spaced abutments for compression spring 272 that normally urges the latch pin upwardly into extended position, most of which is most clearly revealed in FIG. 29.

The foot pedal 274 comprises an elongate member projecting beyond the truncated corners 276 of the platform and turntable to provide foot rests 278. This pedal is apertured at 280 to receive the latch pin shank 264 and the latter has a pin 282 therethrough as a fastener to connect the pedal and pin together. The pedal is confined between the parallel flanges of the channel-shaped member 260 against rotational movement in a horizontal plane but it is free to tilt in a transverse vertical plane using the ends of the channel-shaped member as fulcrums. As the pedal tilts about one or the other of these fulcrums in response to foot pressure thereon, it retracts the latch pin and frees the turntable for rotational movement.

The underside of the platform also carries a foot-pedal-operated dolly pin latch subassembly that has been broadly referred to by reference numeral 284 and which is most clearly revealed in FIGS. 23–28 to which specific reference will now be made. A bracket 286 projects beneath the platform to the rear of the turntable axis and mounts the rear end of arm 288 for pivotal movement in a vertical plane extending along the longitudinal centerline of the dolly. Spring retainers 290 on the underside of the platform and the top of the arm hold a compression spring 292 in place that yieldably biases said arm downwardly.

Mounted on the forward end of arm 288 in position to register with the slots in the floor plates is the dolly pin 120 that has been mentioned many times already. It, together with the arm 288 supporting same are guided vertically by a slotted guideplate 294 fastened to the underside of the platform forwardly of the turntable axis.

Figure 23:
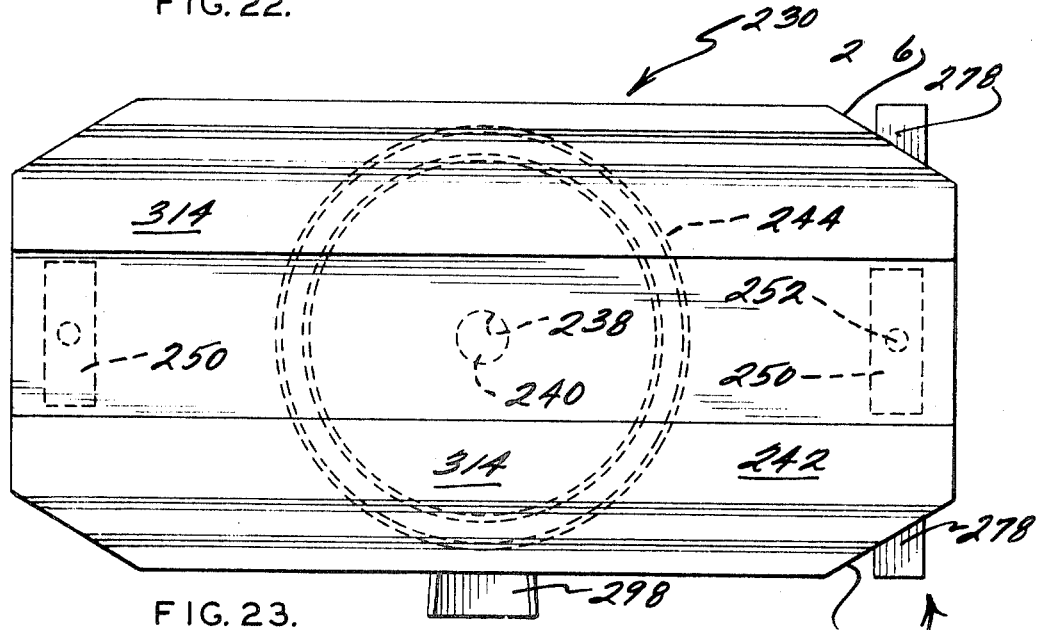
FIG. 23 is a top plan view of the dolly.
Figure 24:
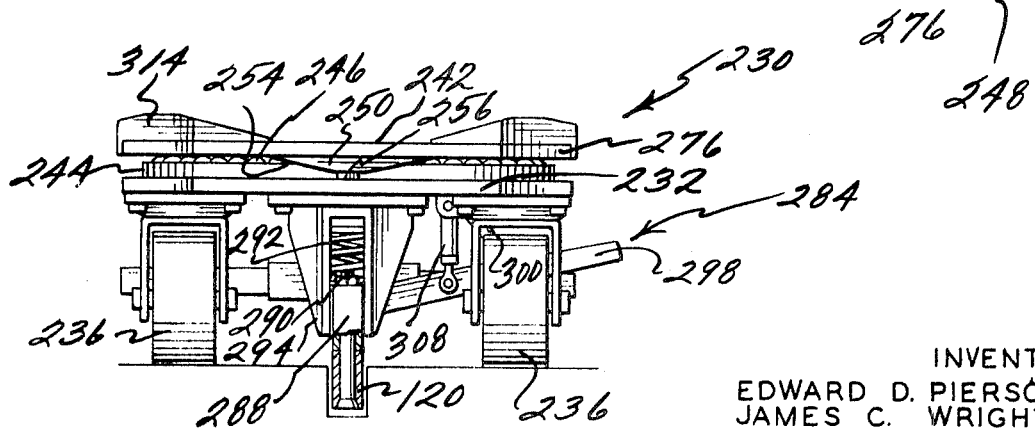
FIG. 24 is a front elevation of the dolly with portions of the retractable pin broken away and shown in section to reveal how it moves within the slotted track.
Figure 25:
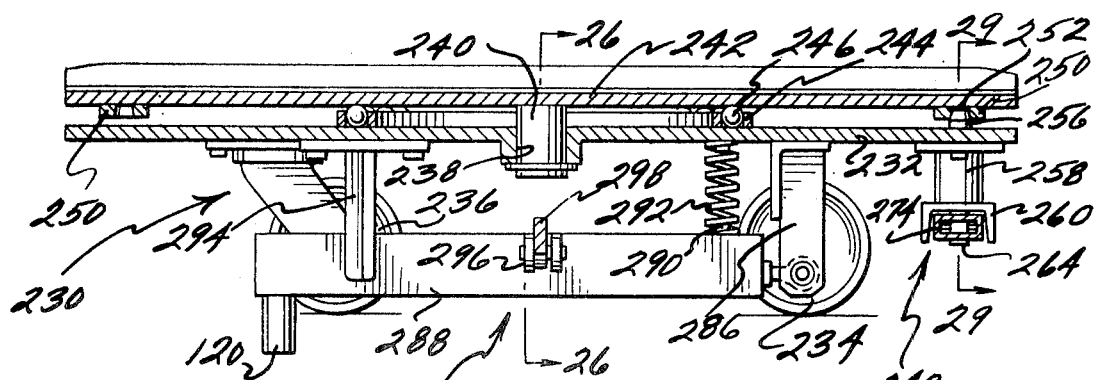
FIG. 25 is a longitudinal section showing the details of the turntable atop the dolly.
Figures 26, 28:
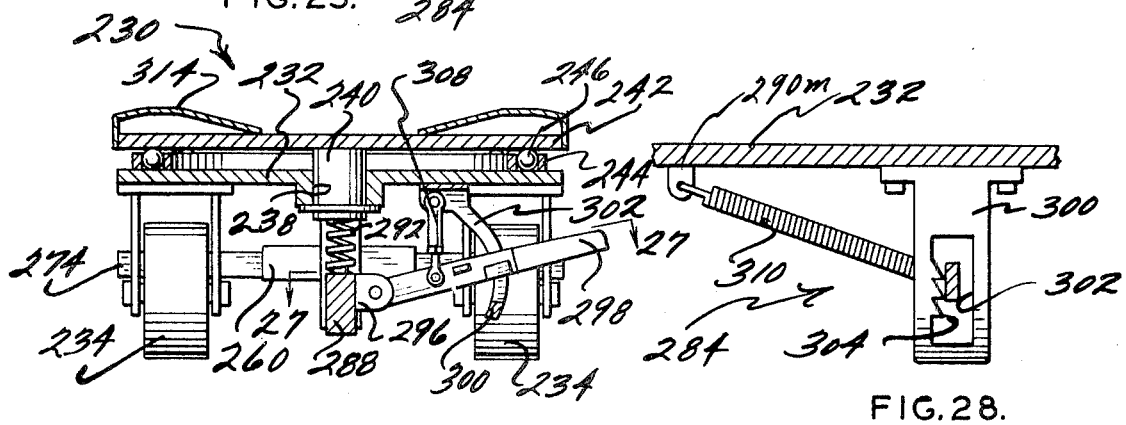
FIG. 26 is a section taken along line 26—26 of FIG. 25.
FIG. 28 is a fragmentary section taken along line 28—28 of FIG. 27 showing the ratchet teeth that cooperate with the foot pedal to define the adjusted positions of the pin; and, FIG. 29 is a fragmentary section taken along line 29—29 of FIG. 25 showing the foot-pedal-operated lock pin for the turntable.
Figure 27:
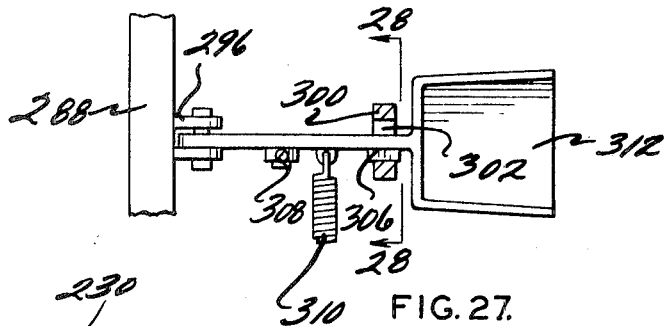
FIG. 27 is a fragmentary section taken along line 27—27 of FIG. 26 showing the foot-pedal-operated retraction mechanism for the dolly pin.
Figure 29:
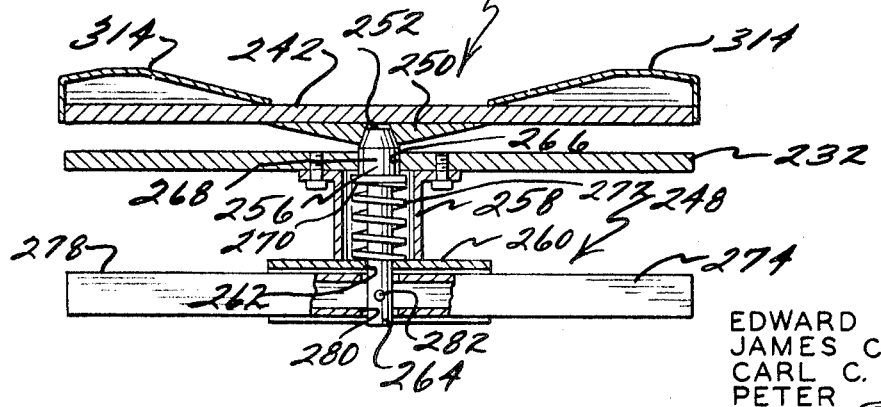

A clevis 296 is provided on one side of arm 288 spaced forwardly of its pivotal connection to bracket 286 and this clevis pivotally mounts an end of foot pedal 298 for vertical movement in a plane normal thereto. An arcuate bracket 300 curved about the axis of pivotal movement of the foot pedal is connected to the underside of the platform and it has an opening 302 therein adapted to receive the foot pedal for movement therein. The rearwardly facing margin of this opening is provided with three ratchet teeth 304 cooperating with a ratchet pawl 306 carried on the side of the foot pedal to locate the dolly pin in any one of three different positions, namely: (1) a fully retracted inoperative one; (2) a partially extended operative position engaged within the floorplate slots but disengaged form the chains and tracks; and, (3) a fully extended operative position engaged in both the floor plate slots and the chains. An adjustable pivot link 308 connected between the bracket 300 and the foot pedal at a point on the latter spaced to one side of its pivotal connection to arm 288 defines the fulcrum about which said foot pedal rocks to raise and lower the dolly pin. A tension spring 310 connected to another spring lug 290*m* the underside of the platform forwardly of the foot pedal releasably biases the latter into ratcheted engagement with the ratchet teeth 304. The pivotal connection between arm 288 and the foot pedal is sufficiently loose to permit the latter to swing rearwardly far enough so that the pawl 306 becomes disengaged from the teeth 304. The free end of the pedal contains a foot rest 312 projecting laterally beyond the platform as shown in FIG. 23.

In closing it is, perhaps, worthwhile noting that the side margins of platform 242 are built up by tapered sideplates 314 adapted to retain a cylindrical newsprint roll centered therebetween on the dolly. They are, of course, unnecessary in transporting articles having a planar under surface.

What is claimed is:
1. The subfloor conveyor system which comprises:
   a base plate and a pair of transversely spaced parallel rail-forming wall members mounted atop said base plate so as to cooperate therewith and with one another to define an upwardly opening endless track;
   means defining floor plates resting atop the wall members and having a continuous slot registering with the track therebeneath, said continuous slot dividing to form a y-shaped intersection defining a primary branch following the track and a secondary branch conveying therewith;
   a primary endless sprocket chain laid within the track for sliding movement therethrough with the axes of pivotal movement between adjacent pivotally interconnected links extending vertically, adjacent links on the top of said chain cooperating with one another at longitudinally spaced intervals to define a gap therebetween;

drive means including a sprocket operatively connected to the chain in driving relation thereto;

a wheeled-dolly adapted for rolling movement atop the floor plates above the slot therein, sad dolly including a pin on the underside thereof near the front movable from a fully retracted position disengaged from said floor plate slot into a partially extended position in guided engagement therewith, and from a partially extended position independent of the sprocket chain into a fully extended position engaged within one of the gaps in the latter so as to move therewith;

a switch arm mounted adjacent the intersection for horizontal movement from a retracted position spaced to one side of the primary sprocket chain a distance adapted to accept a dolly pin therebetween and an extended position alongside thereof, said switch arm when in extended position yieldably blocking the secondary branch of the floor plate slot against the passage of a dolly pin, and said switch arm being adapted to move from its extended into its retracted position upon engagement thereof by a dolly pin moving within said secondary branch toward the primary branch of the floor plate slot; and, biasing means connected to said switch arm normally biasing same into its extended position, said biasing means and switch arm cooperating with one another to move a dolly pin holding the latter in retracted position into the first open gap in the primary sprocket chain that passes the intersection.

2. The subfloor conveyor system as set forth in claim 1 in which:

normally closed switch means is electrically connected to the secondary chain drive means and located alongside the secondary chain; switch actuating means is carried by said second chain positioned and adapted to engage said normally closed switch means and open same; and, gap-sensing means responsive to movement of an open gap in the primary chain toward the intersection is located alongside said chain, said pin-sensing means including a second arm movable from a retracted position alongside the primary chain to an extended position projecting into a gap therein, second biasing means connected to said second arm normally biasing same into extended position, and normally open switch means connected in parallel with the normally closed switch means and connected to said second arm for movement into closed position upon extension of the latter, said normally open switch means being operative when closed to energize the secondary chain drive means momentarily so as to move the switch actuating means from the normally closed switch means thus releasing the latter into closed position, and said normally closed switch means when closed being operative to energize the secondary chain drive means until again reopened upon engagement thereof by a switch actuating means.

3. The subfloor conveyor system which comprises:

a base plate and a pair of transversely spaced parallel rail-forming wall members mounted atop said base plate so as to cooperate therewith and with one another to define a first upwardly opening endless track;

a second pair of spaced parallel track-forming wall members mounted atop the base plate so as to cooperate therewith and with one another to define a second upwardly opening endless track having a portion thereof located alongside the first of said tracks in position to leave a neutral area therebetween sized to receive a dolly pin;

means defining floor plates resting atop the wall members and having a continuous slot registering with the first track therebeneath, said floor plates including a second slot having an intermediate portion registering with the second track therebeneath and an end portion offset to one side of said second track overlying the neutral area prior to merging with said first slot to define an intersection;

first and second endless sprocket chains laid within the first and second tracks for sliding movement therethrough with the axes of pivotal movement between adjacent pivotally interconnected links extending vertically, adjacent links on the top of said chain cooperating with one another at longitudinally spaced intervals to define a gap therebetween;

first and second drive means including sprockets operatively connected to the respective chains in driving relation thereto and operative upon actuation to drive adjacent portions of the respective chains in the same direction;

a wheeled-dolly adapted for rolling movement atop the floor plates above the slot therein, said dolly including a pin on the underside thereof near the front movable from a fully retracted position disengaged from said floor plate slot into a partially extended position in guided engagement therewith, and from a partially extended position independent of the sprocket chain into a fully extended position engaged within one of the gaps in the latter so as to move therewith;

a switch arm located at the intersection for movement from a retracted position alongside the end portion of said second slot to an extended position blocking the entrance thereto; and, biasing means connected to said switch arm normally urging same into extended position, said biasing means and switch arm cooperating with one another to yieldably oppose movement of a dolly pin into the end portion of the second track and also to discharge same therefrom by pushing it on forward into the first gap in the first chain to move past the intersection.

4. The subfloor conveyor system as set forth in claim 2, in which:

the second floor plate slot includes a laterally offset portion spaced ahead of the intersection, said offset portion defining a siding adapted to receive a dolly pin positioned alongside the second chain; a second switch arm is mounted adjacent the siding for movement between a retracted position alongside the second chain and an extended position projecting across the top thereof, said second switch arm being adapted in extended position to cam a dolly pin out of a gap in the second chain onto the siding; servomotor means connected to the second switch arm operative upon actuation to shift the latter into its retracted position; a third switch arm mounted adjacent the siding on the opposite side of the second chain from the second switch arm, said third switch arm being movable between an extended position alongside said second chain and a retracted position adapted to receive a dolly pin therebetween; and, second biasing means connected to said third switch arm normally biasing same into its extended position, said second biasing means and third switch arm cooperating with the second switch arm in its extended position to hold a dolly pin on the siding against the side of the second chain, and said second biasing means and third switch arm cooperating with said second switch arm in retracted position to return a dolly pin on the siding to the first open gap in the second chain that moves therepast.

5. The subfloor conveyor system as set forth in claim 4 in which:

gap-sensing means are located adjacent the first chain ahead of the intersection, said means including a fourth arm mounted for movement between a retracted position alongside the first chain and an extended position projecting into a gap in the latter, third biasing means connected to said fourth arm normally biasing same into its extended position, and normally open switch means connected to the fourth arm and to the servomotor, said switch means and fourth arm cooperating in the extended position of the latter to actuate said servomotor so as to retract the second switch arm.

6. The subfloor conveyor system as set forth in claim 4 in which:
a first normally closed switch means electrically connected to the secondary chain drive means is located adjacent the third switch arm and is operative to open upon actuation of the latter into retracted position; and, in which pin-sensing means are positioned adjacent the secondary chain ahead of the siding, said means including a fourth are movable from an extended position projecting out over the secondary chain in position to be engaged by a dolly pin moving therepast and a retracted position alongside thereof, third biasing means connected to said fourth switch arm normally urging same into its extended position, and a second normally closed switch means operatively connected to said fourth arm so as to open upon actuation of the latter into its retracted position, said second normally closed switch means being connected in parallel with said first normally closed switch means, and said second normally closed switch means being operative to deenergize the secondary chain drive means upon actuation thereof into open position by a dolly pin when said first normally closed switch means is open indicating the presence of a dolly on the siding.

7. The subfloor conveyor system which comprises:
a base plate and a pair of transversely spaced parallel rail-forming wall members mounted atop said base plate so as to cooperate therewith and with one another to define a first upwardly opening endless track;
a second pair of spaced parallel track-forming wall members mounted atop the base plate so as to cooperate therewith and with one another to define a second upwardly opening endless track having a portion thereof located alongside the first of said tracks in position to leave a neutral area therebetween sized to receive a dolly pin;
means defining floor plates resting atop the wall members and having a continuous slot registering with the first track therebeneath, said floor plates including a second slot emerging from the first slot to define an intersection having an intake portion offset alongside the first track overlying the neutral area and a discharge portion registering with said second track connected to receive a dolly pin leaving said intake portion;
first and second endless sprocket chains laid within the first and second tracks for sliding movement therethrough with the axes of pivotal movement between adjacent pivotally interconnected links extending vertically, adjacent links on the top of said chain cooperating with one another at longitudinally spaced intervals to define a gap therebetween;
first and second drive means including sprockets operatively connected to the respective chains in driving relation thereto and operative upon actuation to drive adjacent portions of the respective chains in the same direction;
a wheeled-dolly adapted for rolling movement atop the floor plates above the slot therein, said dolly including a pin on the underside thereof near the front movable from a fully retracted position disengaged from said floor plate slot into a partially extended position in guided engagement therewith, and from a partially extended position independent of the sprocket chain into a fully extended position engaged within one of the gaps in the latter so as to move therewith;
a first switch arm overlying the second chain movable from fully extended position yieldably blocking entry of a dolly pin into the intake portion of said second slot and a partially extended position yieldably blocking movement of a dolly pin into the discharge portion, and between said partially extended position and a retracted position opening said discharge portion to the passage of a dolly pin;
biasing means connected to said first switch arm normally urging same into one of its extended positions and cooperating therewith to yieldably block the movement of a dolly pin into both the intake and discharge portions of the second slot;
a second switch arm located adjacent the intersection for movement from a retracted inoperative position alongside the first chain into a partially extended position overlying the latter that is adapted to shunt a dolly pin moving along with the first chain out of a gap therein and into the neutral area so as to partially retract said first switch arm, and from said partially extended position into a fully extended position overlying a portion of the neutral area where it is adapted to guide a dolly pin into a gap in the second chain while moving said first switch arm into retracted position in opposition to the bias exerted thereon by the biasing means; and,
servomotor means connected to the second switch arm operative in a first position to shift the latter from its retracted position into its partially extended position and in a second position to shift same into its fully extended position.

8. The subfloor conveyor system as set forth in claim 7, in which:
a pin-sensing means is located alongside the first chain ahead of the intersection, said means including a third switch arm mounted for movement between an extended position projecting out over said first chain in position to be engaged by a dolly pin within a gap moving therepast and a retracted position alongside thereof, second biasing means connected to said third switch arm normally biasing same into its extended position, and normally open switch means connected to the third switch arm and to the servomotor means, said normally open switch means being operative when closed to actuate said servomotor means from its inoperative into its first operative position; gap-sensing means located alongside the second chain at the same distance ahead of the intersection as the pin-sensing means, said gap-sensing means including a fourth switch arm movable from a retracted position alongside said second chain to an extended position projecting into a gap therein, third biasing means connected to said fourth switch arm normally biasing same into its extended position, and normally closed switch means connected to said fourth switch arm operative to close upon movement of the latter into its extended position; holding means connected to the servomotor means operative upon actuation thereof into first position to hold same thus actuated after the normally open switch reopens until said servomotor is energized into its second position; and, time delay means connected to said servomotor means and to said normally closed switch means, said time delay means being operative upon release of said normally closed switch means into closed position to momentarily actuate said servomotor means from its first into its second operative position after the lapse of the time interval required for the previously sensed gap in the second chain to move forward to a position to receive the dolly pin holding in the neutral area.

9. The subfloor conveyor system which comprises:
a base plate and a pair of transversely spaced parallel rail-forming wall members mounted atop said base plate so as to cooperate therewith and with one another to define an upwardly opening endless track;
means defining floor plates resting atop the wall members and having a continuous slot registering with the track therebeneath;
an endless sprocket chain laid within the track for sliding movement therethrough with the axes of pivotal movement between adjacent pivotally interconnected links extending vertically, adjacent links on the top of said chain cooperating with one another at longitudinally spaced intervals to define a gap therebetween;

drive means including a sprocket operatively connected to the chain in driving relation thereto;

a wheeled-dolly adapted for rolling movement atop the floor plates above the slot therein, said dolly including a pin on the underside thereof near the front movable from a fully retracted position disengaged from said floor plate slot into a partially extended position in guided engagement therewith, and from a partially extended position independent of the sprocket chain into a fully extended position engaged within one of the gaps in the latter so as to move therewith;

said rail-forming wall members shaped to move the track defined thereby away from the slot in the floor plates for a short distance across which gap the dolly pin becomes disengaged from the primary sprocket chain;

slack takeup means mounted between the base plates and floor plates for adjustable movement transversely of the primary sprocket chain within said gap, said takeup means being adapted to engage said primary chain and remove the slack therefrom upon adjustment;

a secondary sprocket chain loop guided alongside the floor plate slot across the gap in the track;

dog means projecting laterally from the secondary chain beneath the floor plate slot adapted to engage a dolly pin projecting therethrough;

drive means connected to the secondary chain operative upon actuation to drive same in a direction to push the dolly across the gap with the dog means;

pin-sensing means located alongside the track at the entrance to the slack takeup gap, said means including a switch arm movable from an extended position projecting out over the primary sprocket chain where it will be engaged by a dolly pin moving along in a gap therein and a retracted position alongside the latter, biasing means connected to said switch arm normally urging same into its extended position, and normally open switch means connected to said switch arm and the drive means for the secondary chain, said switch arm being operative upon movement thereof into retracted position by a dolly pin engaging same to close the switch means and momentarily actuate the drive means; and normally closed switch means located in the path of the secondary chain dog and operatively connected in parallel with said first switch means to said secondary chain drive means, said dog and normally closed switch means cooperating to hold the latter open and deenergize the secondary chain drive means while the normally open switch means remains open, and said dog and normally closed switch means cooperating to release the latter into its normally closed position upon momentary closure of said normally open switch means so as to energize said secondary chain drive means until the dog completes its excursion around the secondary chain loop carrying the dolly pin that actuated the first switch means across the gap before reopening said second switch means.

10. The subfloor conveyor system which comprises:

a base plate and a pair of transversely spaced parallel rail-forming wall members mounted atop said base plate so as to cooperate therewith and with one another to define an upwardly opening endless track;

means defining floor plates resting atop the wall members and having a continuous slot registering with the track therebeneath;

an endless sprocket chain laid within the track for sliding movement therethrough with the axes of pivotal movement between adjacent pivotally interconnected links extending vertically, adjacent links on the top of said chain cooperating with one another at longitudinally spaced intervals to define a gap therebetween;

drive means including a sprocket operatively connected to the chain in driving relation thereto;

a wheeled-dolly adapted for rolling movement atop the floor plates above the slot therein, said dolly including a pin on the underside thereof near the front movable from a fully retracted position disengaged from said floor plate slot into a partially extended position in guided engagement therewith, and from a partially extended position independent of the sprocket chain into a fully extended position engaged within one of the gaps in the latter so as to move therewith;

said rail-forming wall members shaped to move the track defined thereby away from the slot in the floor plates for a short distance across which gap the dolly pin becomes disengaged from the primary sprocket chain;

slack takeup means mounted between the bed plates and floor plates for adjustable movement transversely of the primary sprocket chain within said gap, said takeup means being adapted to engage said primary chain and remove the slack therefrom upon adjustment;

a secondary sprocket chain loop guided alongside the floor plate slot across the gap in the track;

dog means projecting laterally form the secondary chain beneath the floor plate slot adapted to engage a dolly pin projecting therethrough;

drive means connected to the secondary chain operative upon actuation to drive same in a direction to push the dolly across the gap with the dog means;

a stop located adjacent the track in position to receive a dolly pin as it leaves the dog means on the secondary sprocket chain and hold same alongside the primary chain at a point beyond the slack takeup gap where the later has returned to its position beneath the slot;

a switch arm mounted adjacent the stop in position to engage a dolly pin resting thereagainst, said switch arm being movable from a retracted position spaced alongside the primary chain a distance sized to admit a dolly pin therebetween and an extended position closely adjacent said primary chain; and biasing means connected to said switch arm normally urging same into its extended position, said biasing means and switch arm cooperating in the extended position of the latter to yieldably receive a dolly pin moving into position against the stop while moving into retracted position, and said biasing means and switch arm cooperating in retracted position to continuously urge a dolly pin resting against the stop against the side of the primary chain where it will immediately enter the first gap therein that comes along.

11. The subfloor conveyor system which comprises:

a base plate and a pair of transversely spaced parallel rail-forming wall members mounted atop said base plate so as to cooperate therewith and with one another to define an upwardly opening endless track;

means defining floor plates resting atop the wall members and having a continuous slot registering with the track therebeneath, said slot dividing to form a y-shaped intersection defining a primary branch and a secondary branch diverging therefrom;

a primary endless sprocket chain laid within the track for sliding movement therethrough with the axes of pivotal movement between adjacent pivotally interconnected links extending vertically, adjacent links on the top of said chain cooperating with one another at longitudinally spaced intervals to define a gap therebetween;

drive means including a sprocket operatively connected to the chain in driving relation thereto;

a wheeled-dolly adapted for rolling movement atop the floor plates above the slot therein, said dolly including a pin on the underside thereof near the front movable from a fully retracted position disengaged from said floor plate slot into a partially extended position in guided engagement therewith, and from a partially extended position independent of the sprocket chain into a fully extended position engaged within one of the gaps in the latter so as to move therewith;

a switch arm mounted adjacent said y-shaped intersection for horizontal movement from a retracted inoperative position alongside the primary chain to an extended operative position projecting out over the top thereof, a portion of the edge of said arm defining a cam surface in the operative position thereof adapted to engage a dolly pin carried in a gap in the primary chain and redirect same of onto the secondary branch of the floor plate slot;

a secondary sprocket chain loop guided between the base plate and floor plate alongside the secondary slot in the latter;

dog means projecting laterally from said secondary sprocket chain beneath the secondary floor plate slot adapted to engage a dolly pin projecting therethrough;

drive means connected to the secondary chain operative upon actuation to drive same in a direction to move the dolly along the secondary branch of the floor plate slot;

a secondary stationary floor plate with a slot therein displaced horizontally to one side of the floor plates containing the original slot bordering the secondary chain track in coplanar relation thereto; and a movable slotted floor plate section is supported for horizontal movement with a dolly atop thereof and its pin disengaged from said secondary chain between a first position wherein the slot therein registers in end-to-end relation with the original slot and a second position wherein said movable plate slot registers in like relation with the slot in said second plate.

12. The subfloor conveyor system which comprises:

a base plate and a pair of transversely spaced parallel rail-forming wall members mounted atop said base plate so as to cooperate therewith and with one another to define an upwardly opening endless track;

means defining floor plates resting atop the wall members and having a continuous slot registering with the track therebeneath, said slot dividing to form a y-shaped intersection defining a primary branch and a secondary branch diverging therefrom;

a primary endless sprocket chain laid within the track for sliding movement therethrough with the axes of pivotal movement between adjacent pivotally interconnected links extending vertically, adjacent links on the top of said chain cooperating with one another at longitudinally spaced intervals to define a gap therebetween;

drive means including a sprocket operatively connected to the chain in driving relation thereto;

a wheeled-dolly adapted for rolling movement atop the floor plates above the slot therein, said dolly including a pin on the underside thereof near the front movable from a fully retracted position disengaged from said floor plate slot into a partially extended position in guided engagement therewith, and from a partially extended position independent of the sprocket chain into a fully extended position engaged within one of the gaps in the latter so as to move therewith;

a switch arm mounted adjacent said y-shaped intersection for horizontal movement from a retracted inoperative position alongside the primary chain to an extended operative position projecting out over the top thereof, a portion of the edge of said arm defining a cam surface in the operative position thereof adapted to engage a dolly pin carried in a gap in the primary chain and redirect same off onto the secondary branch of the floor plate slot;

a secondary sprocket chain loop guided between the base plate and floor plate alongside the secondary slot in the latter;

dog means projecting laterally from said secondary sprocket chain beneath the secondary floor plate slot adapted to engage a dolly pin projecting therethrough;

drive means connected to the secondary chain operative upon actuation to drive same in a direction to move the dolly along the secondary branch of the floor plate slot; and pin-sensing means operatively connected to the secondary chain drive means located adjacent the primary chain ahead of the intersection, said pin-sensing means including a switch arm responsive to movement of a dolly pin therepast by moving from an extended into a retracted position, and a normally open switch connected in an electrical circuit with the secondary chain drive means and connected to said switch arm, said switch being operative to close upon actuation of the switch arm into retracted position and energize the drive means.

13. The subfloor conveyor system which comprises:

a base plate and a pair of transversely spaced parallel rail-forming wall members mounted atop said base plate so as to cooperate therewith and with one another to define an upwardly opening endless track;

means defining floor plates resting atop the wall members and having a continuous slot registering with the track therebeneath, said slot dividing to form a y-shaped intersection defining a primary branch and a secondary branch diverging therefrom;

a primary endless sprocket chain laid within the track for sliding movement therethrough with the axes of pivotal movement between adjacent pivotally interconnected links extending vertically, adjacent links on the top of said chain cooperating with one another at longitudinally spaced intervals to define a gap therebetween;

drive means including a sprocket operatively connected to the chain in driving relation thereto;

a wheeled-dolly adapted for rolling movement atop the floor plates above the slot therein, said dolly including a pin on the underside thereof near the front movable from a fully retracted position disengaged from said floor plate slot into a partially extended position in guided engagement therewith, and from a partially extended position independent of the sprocket chain into a fully extended position engaged within one of the gaps in the latter so as to move therewith;

a switch arm mounted adjacent said y-shaped intersection for horizontal movement from a retracted inoperative position alongside the primary chain to an extended operative position projecting out over the top thereof, a portion of the edge of said arm defining a cam surface in the operative position thereof adapted to engage a dolly pin carried in a gap in the primary chain and redirect same off onto the secondary branch of the floor plate slot;

a secondary sprocket chain loop guided between the base plate and floor plate alongside the secondary slot in the latter;

dog means projecting laterally from said secondary sprocket chain beneath the secondary floor plate slot adapted to engage a dolly pin projecting therethrough;

drive means connected to the secondary chain operative upon actuation to drive same in a direction to move the dolly along the secondary branch of the floor plate slot;

biasing means engaging the switch arm and normally biasing latter into retracted position; and, a second dog means attached to the secondary chain projecting laterally therefrom in a position spaced forwardly of the first dog means, said second dog means being positioned and adapted to engage said switch arm and hold same in its extended position upon movement of said secondary chain during the interval required for said first dog means to move a dolly pin off the primary branch and onto the secondary branch.

14. The subfloor conveyor system which comprises:

a base plate and a pair of transversely spaced parallel rail-forming wall members mounted atop said base plate so as to cooperate therewith and with one another to define an upwardly opening endless track;

means defining floor plates resting atop the wall members and having a continuous slot registering with the track therebeneath, said slot dividing to form a y-shaped intersection defining a primary branch and a secondary branch diverging therefrom;

a primary endless sprocket chain laid within the track for sliding movement therethrough with the axes of pivotal movement between adjacent pivotally interconnected links extending vertically, adjacent links on the top of said chain cooperating with one another at longitudinally spaced intervals to define a gap therebetween;

drive means including a sprocket operatively connected to the chain in driving relation thereto;

a wheeled-dolly adapted for rolling movement atop the floor plates above the slot therein, said dolly including a pin on the underside thereof near the front movable from a fully retracted position disengaged from said floor plate slot into a partially extended position in guided engagement therewith, and from a partially extended position independent of the sprocket chain into a fully extended position engaged within one of the gaps in the latter so as to move therewith;

a switch arm mounted adjacent said y-shaped intersection for horizontal movement from a retracted inoperative position alongside the primary chain to an extended operative position projecting out over the top thereof, a portion of the edge of said arm defining a cam surface in the operative position thereof adapted to engage a dolly pin carried in a gap in the primary chain and redirect same off onto the secondary branch of the floor plate slot;

a secondary sprocket chain loop guided between the base plate and floor plate alongside the secondary slot in the latter;

dog means projecting laterally from said secondary sprocket chain beneath the secondary floor plate slot adapted to engage a dolly pin projecting therethrough;

drive means connected to the secondary chain operative upon actuation to drive same in a direction to move the dolly along the secondary branch of the floor slot;

a normally closed switch means electrically connected to the secondary chain drive means and positioned in the path of the second dog means;

a second dog means carried by the secondary chain projecting laterally therefrom from a position spaced forwardly of the first dog means, said second dog means being operative upon movement of the secondary chain to engage the normally closed switch means and actuate same into its open position thus deenergizing the secondary chain drive means; and a pin-sensing means responsive to the movement of a dolly pin toward the intersection within a gap in the primary chain is located alongside the latter, said pin-sensing means including an arm movable from an extended position projecting across the primary chain in the path of a dolly pin carried along in a gap therein to a retracted position alongside thereof, biasing means connected to said arm normally biasing same into its extended position, and normally open switch means connected in parallel with the normally closed switch means and connected to said arm for movement into closed position upon retraction of the latter, said normally open switch means being operative when closed to energize the secondary chain drive means momentarily so as to move the second dog means from the normally closed switch means thus releasing the latter to closed position, and said normally closed switch means when closed being operative to energize the secondary chain drive means until again reopened upon engagement thereof by a second means.

15. The subfloor conveyor system as set forth in claim 14 in which:

the second dog means is positioned and adapted to engage and extend the switch means for the interval required for the first dig means to transfer a dolly pin off onto the secondary branch.

* * * * *

PO-1050
(5/69)

UNITED STATES PATENT OFFICE
CERTIFICATE OF CORRECTION

Patent No. 3,648,618              Dated  March 14, 1972

Inventor(s) Pierson, Edward D., Wright, James C., and Carl C. DeRozario

It is certified that error appears in the above-identified patent and that said Letters Patent are hereby corrected as shown below:

Column 4, line 33, "downs" should be --down--.

Column 8, line 33, "92c" should be --12c--;
          line 47, "be" should be --by--.

Column 9, line 4, "through" should be --though--.

Column 14, line 36, claim 4, "2" should be --3--.

Column 15, line 11, claim 6, "are" should be --arm--.

Column 18, line 20, claim 10, "form" should be --from--;
          line 30, claim 10, "later" should be --latter--.

Column 19, line 8, claim 11, "of" should be --off--.

Column 22, line 33, claim 15, "dig" should be --dog--.

Signed and sealed this 6th day of February 1973.

(SEAL)
Attest:

EDWARD M. FLETCHER, JR.              ROBERT GOTTSCHALK
Attesting Officer                    Commissioner of Patents